United States Patent

Yoshida

(10) Patent No.: US 12,000,936 B2
(45) Date of Patent: Jun. 4, 2024

(54) POSITIONING SYSTEM, EQUIPMENT, SERVER APPARATUS, POSITIONING METHOD AND PROGRAM

(71) Applicant: Nippon Telegraph and Telephone Corporation, Tokyo (JP)

(72) Inventor: Seiji Yoshida, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 101 days.

(21) Appl. No.: 17/762,586

(22) PCT Filed: Sep. 24, 2019

(86) PCT No.: PCT/JP2019/037359
§ 371 (c)(1),
(2) Date: Mar. 22, 2022

(87) PCT Pub. No.: WO2021/059346
PCT Pub. Date: Apr. 1, 2021

(65) Prior Publication Data
US 2022/0334265 A1 Oct. 20, 2022

(51) Int. Cl.
*G01S 19/30* (2010.01)
*G01S 19/25* (2010.01)

(52) U.S. Cl.
CPC ............ *G01S 19/30* (2013.01); *G01S 19/25* (2013.01)

(58) Field of Classification Search
CPC ................................ G01S 19/25; G01S 19/30
USPC ........................................................ 375/150
See application file for complete search history.

(56) References Cited

U.S. PATENT DOCUMENTS

| 9,989,650 B2* | 6/2018 | Phuyal ...................... G01S 5/16 |
| 2009/0194104 A1* | 8/2009 | Van Sickle ............ G16H 40/63 |
| | | 128/203.12 |
| 2010/0073229 A1 | 3/2010 | Pattabiraman et al. |
| 2014/0214317 A1 | 7/2014 | Sanjay et al. |
| 2016/0259062 A1* | 9/2016 | Raghupathy ............ G01S 19/48 |
| 2019/0079529 A1 | 3/2019 | Kamata |

(Continued)

FOREIGN PATENT DOCUMENTS

| JP | 2012-237606 | 12/2012 |
| JP | 2015-052601 | 3/2015 |
| JP | 2017-142272 | 8/2017 |

(Continued)

OTHER PUBLICATIONS

Kubo, "A Study on GPS Multipath Mitigation and its Practicability for Highly Precise Positioning," Doctoral Thesis, Tokyo University of Marine Science and Technology, 2005, 618 pages.

*Primary Examiner* — Leila Malek
(74) *Attorney, Agent, or Firm* — Fish & Richardson P.C.

(57) ABSTRACT

A positioning system includes equipment that receives a signal from a GNSS satellite, and a server apparatus that is connected to the equipment via a communication network. The equipment includes a memory and a processor configured to transmit information indicated by the signal to the server apparatus, and perform positioning of the equipment by using the information indicated by the signal. The server apparatus includes a memory and a processor configured to perform positioning of the equipment by using the information indicated by the signal received from the equipment.

10 Claims, 14 Drawing Sheets

(56) References Cited

U.S. PATENT DOCUMENTS

2020/0081135 A1   3/2020  Yamazaki

FOREIGN PATENT DOCUMENTS

| JP | 2019-048511 | 3/2019 |
|---|---|---|
| WO | WO 2019/003623 | 1/2019 |

* cited by examiner

POSITIONING SYSTEM, EQUIPMENT, SERVER APPARATUS, POSITIONING METHOD AND PROGRAM

TECHNICAL FIELD

The present invention relates to a positioning system, equipment, a server apparatus, a positioning method, and a program.

BACKGROUND ART

Global Navigation Satellite System (GNSS) receivers and the like are known as equipment or an apparatus for performing positioning and time synchronization by receiving navigation satellite signals from GNSS satellites via radio waves.

In addition, positioning methods using navigation satellite signals include a code-based positioning method, a carrier-phase-based positioning (interference positioning) method, and the like, and it is known that positioning can be performed with higher accuracy in the carrier-phase-based positioning method than in the code-based positioning method. In a reception environment in which a multipath environment occurs in radio waves received from a GNSS satellite, a technique for reducing a deterioration in positioning accuracy due to the influence of the multipath environment is known (see, for example, NPL 1).

CITATION LIST

Non Patent Literature

NPL 1: Nobuaki Kubo, "A Study on GPS Multipath Mitigation and its Practicability for Highly Precise Positioning", doctoral thesis, Tokyo University of Marine Science and Technology, 2005

SUMMARY OF THE INVENTION

Technical Problem

However, carrier-phase-based positioning requires more computation processing than code-based positioning, and thus a GNSS receiver corresponding to carrier-phase-based positioning is often more expensive than a GNSS receiver which is only capable of code-based positioning. For this reason, when highly accurate positioning is desired to be performed, the cost of a GNSS receiver tends to increase. As a countermeasure for this, when the computation of carrier-phase-based positioning is performed by a server or the like connected to a GNSS receiver via a communication network, highly accurate positioning can be performed even by a low-cost GNSS receiver. In a GNSS receiver that performs carrier-phase-based positioning, power consumption increases due to computation processing, which results in issues in application for cases where power saving operations are required, such as facility maintenance of bridge facilities.

An embodiment of the present invention has been made in view of the above-described circumstances, and an object thereof is to perform highly accurate positioning.

Means for Solving the Problem

In order to achieve the above-described object, a positioning system according to an embodiment includes equipment that receives a signal from a GNSS satellite, and a server apparatus that is connected to the equipment via a communication network. The equipment includes a memory and a processor configured to transmit information indicated by the signal to the server apparatus, and perform positioning of the equipment by using the information indicated by the signal. The server apparatus includes a memory and a processor configured to perform positioning of the equipment by using the information indicated by the signal received from the equipment.

Effects of the Invention

Highly accurate positioning can be performed.

DESCRIPTION OF EMBODIMENTS

Hereinafter, embodiments of the present invention will be described. In the embodiments of the present invention, description will be given of a positioning system 1 capable of performing highly accurate positioning even by a low-cost GNSS receiver by allowing positioning or the like to be performed even by a server apparatus connected to the GNSS receiver via a communication network. Here, in general, the GNSS receiver receives signals from at least four GNSS satellites and specifies three-dimensional location information (x, y, z) and time information t (more exactly, a time offset Δt between a clock (an atomic clock) mounted on a GNSS satellite and a clock mounted on a GNSS receiver) to perform positioning of the location information and synchronization of the time information. Consequently, hereinafter, specifying four parameters (x, y, z) and Δt for performing positioning of location information and synchronization of time information will also be simply represented by "positioning".

First Embodiment

Figure 1:
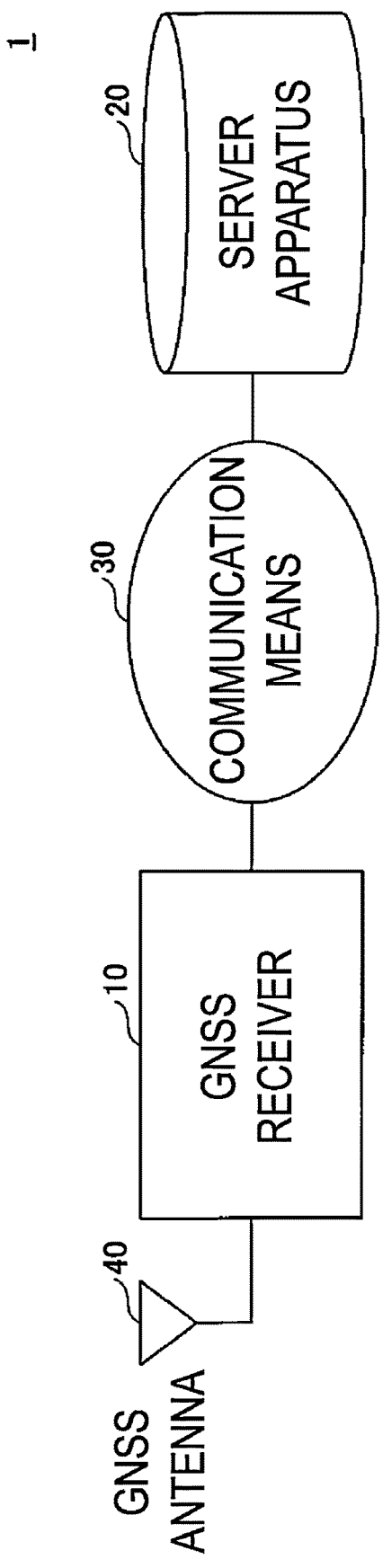
FIG. 1 is a diagram illustrating an example of an overall configuration of a positioning system according to a first embodiment.

Hereinafter, a first embodiment will be described.
Overall Configuration
First, an overall configuration of the positioning system 1 according to the present embodiment will be described with reference to FIG. 1. FIG. 1 is a diagram illustrating an example of an overall configuration of the positioning system 1 according to the first embodiment.

As illustrated in FIG. 1, the positioning system 1 according to the present embodiment includes one or more GNSS receivers 10 and a server apparatus 20. The GNSS receivers 10 and the server apparatus 20 are communicatively connected to each other via a communication means 30 including a communication network such as a mobile phone network or the Internet. Note that the GNSS receivers 10 and the server apparatus 20 may be installed on-premises, that is, at the same base.

The GNSS receiver 10 is equipment that can receive a navigation satellite signal by a GNSS antenna 40 and perform positioning and time synchronization. A positioning method corresponds to a code-based positioning method and a carrier-phase-based positioning (interference positioning) method.

The GNSS receiver 10 may be carried on any mobile object (a vehicle, a person, or the like) or may be used in a stationary state such as measurement or machine guidance of a device. The GNSS receiver 10 receives navigation satellite signals (hereinafter, also referred to as "GNSS satellite signals") from a GNSS satellite at a predetermined time interval (for example, every second) via radio waves to perform positioning. The GNSS receiver 10 transmits a pseudo range obtained on the process of positioning computation processing and data, called observational data or raw data, obtained as a result of carrier-phase-based positioning to the server apparatus 20 via the communication means 30, and thus positioning computation processing corresponding to a code-based positioning method and a carrier-phase-based positioning (interference positioning) method can also be performed in the server apparatus 20.

The communication means 30 is a means for allowing data communication such as serial communication, and includes wired communication such as an Ethernet or an Internet Protocol (IP) network, in addition to wireless communication such as mobile communication, Wi-Fi, or specific low power radio. The observational data may be transmitted from the GNSS receivers 10 to the server apparatus 20 sequentially (in real time) in accordance with a format such as Radio Technical Commission for Maritime Services (RTCM) as an example. Alternatively, data temporarily stored in the GNSS receiver 10 and compressed in the format of Receiver Independent Exchange (RINEX) or the like may be transmitted to the server apparatus 20 on a regular basis (for example, every minute, or the like) or on an irregular basis.

In addition, the GNSS receiver 10 may be a smart phone, a tablet terminal, an on-board device, a wearable device, a portable gaming device, or the like in which an application program for realizing the function of the GNSS receiver is installed, in addition to equipment such as a GNSS tracker (or a GNSS logger).

The server apparatus 20 is a computer or a computer system that performs positioning of the GNSS receiver 10 using observational data and the like received from the GNSS receiver 10.

Note that the overall configuration of the positioning system 1 illustrated in FIG. 1 is an example, and other configurations may be adopted. For example, the positioning system 1 according to the present embodiment may include a plurality of server apparatuses 20.

Figure 2:
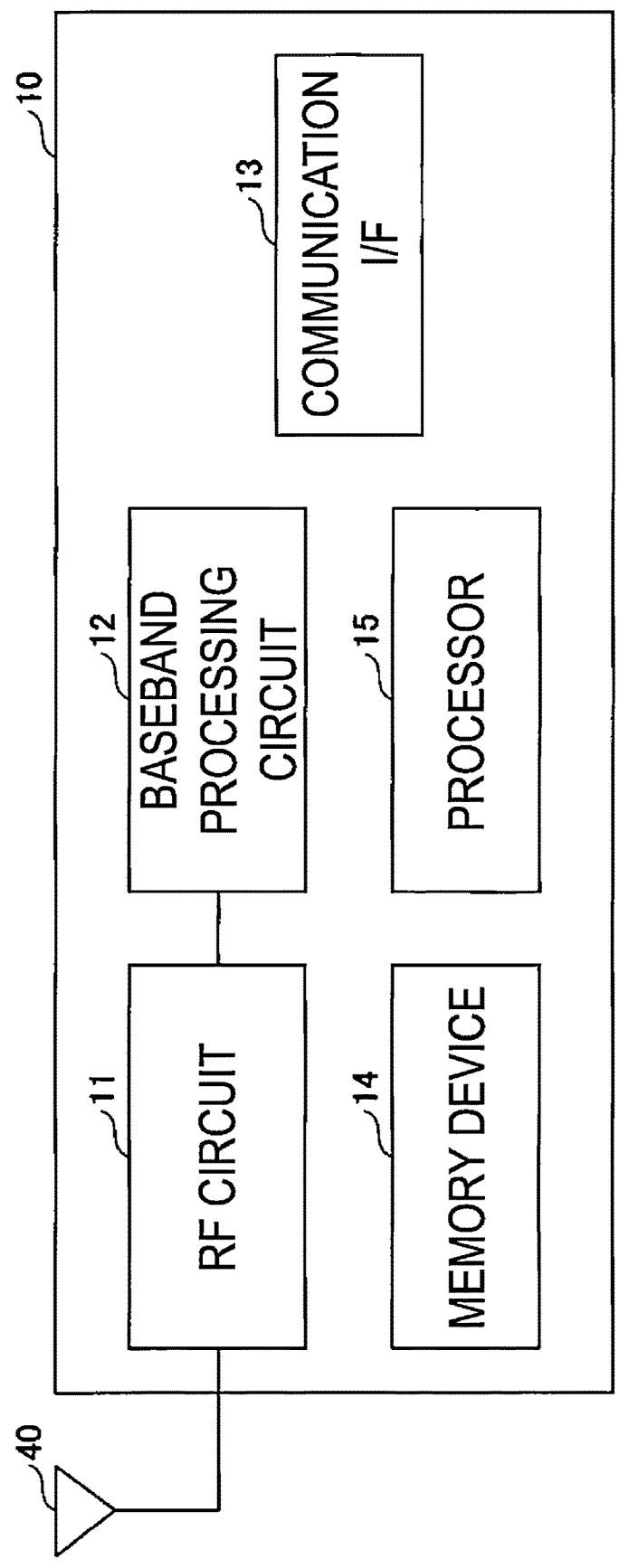
FIG. 2 is a diagram illustrating an example of a hardware configuration of a GNSS receiver according to the first embodiment.
Figure 3:
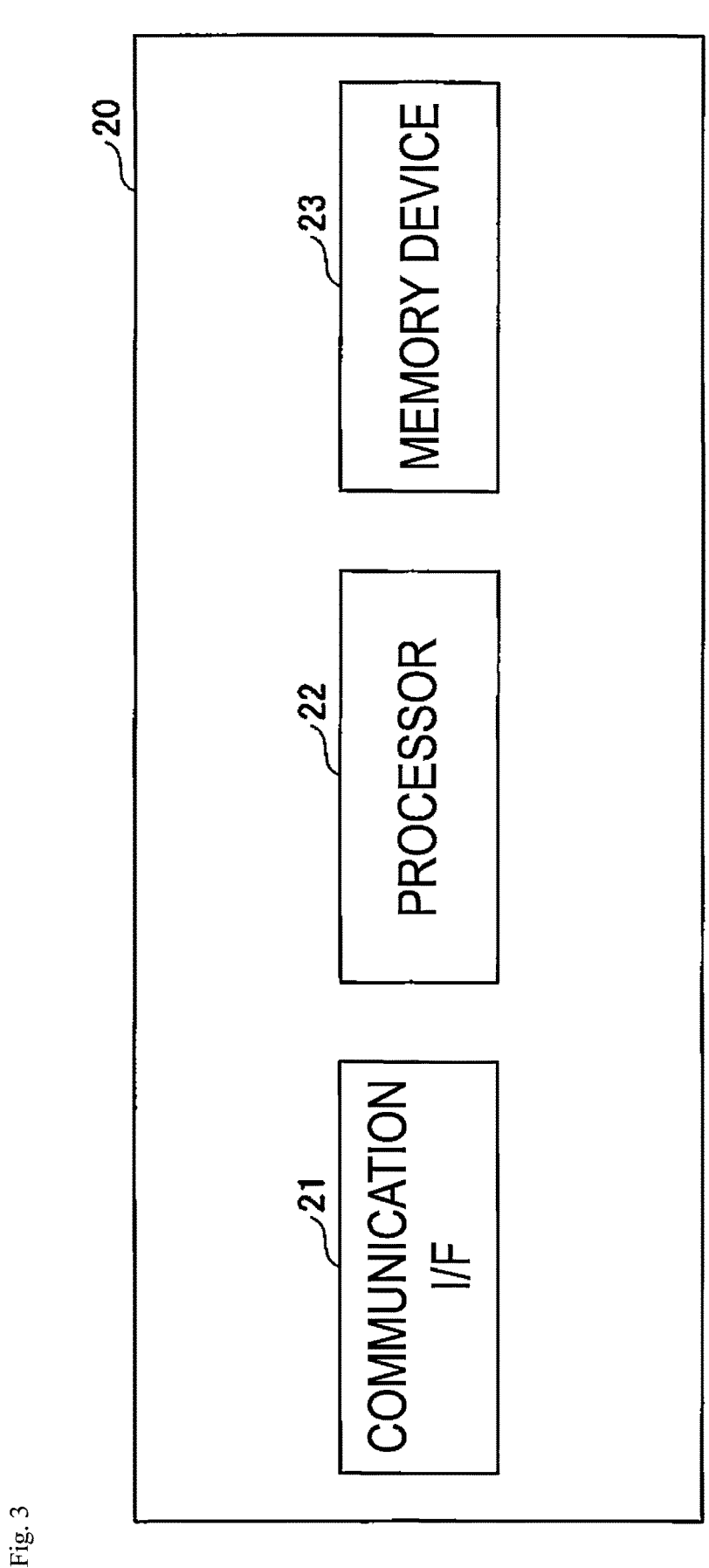
FIG. 3 is a diagram illustrating an example of a hardware configuration of a server apparatus according to the first embodiment.

Hardware Configuration
Next, the hardware configurations of the GNSS receiver 10 and the server apparatus 20 included in the positioning system 1 according to the present embodiment will be described with reference to FIGS. 2 and 3, respectively. FIG. 2 is a diagram illustrating an example of a hardware configuration of GNSS receiver 10 according to the first embodiment. FIG. 3 is a diagram illustrating an example of a hardware configuration of the server apparatus 20 according to the first embodiment.

GNSS Receiver 10
As illustrated in FIG. 2, the GNSS receiver 10 according to the present embodiment includes an RF circuit 11, a baseband processing circuit 12, a communication I/F 13, a memory device 14, and a processor 15.

The RF circuit 11 is connected to the GNSS antenna 40 by a coaxial cable or the like. The RF circuit 11 is a circuit for amplifying navigation satellite signals received by the GNSS antenna 40 and performing signal processing such as filtering and frequency down conversion. The baseband processing circuit 12 is a circuit for performing correlation signal processing and pseudo range measurement. The communication I/F 13 is an interface for communicating with the server apparatus 20 via the communication means 30. The memory device 14 is any of various storage devices such as a Random Access Memory (RAM), a Read Only Memory (ROM), and a flash memory, and stores setting details, satellite orbit data such as an ephemeris and an almanac, observational data, and the like. The processor 16 is any of various computation devices such as a Central Processing Unit (CPU) or a Micro Processing Unit (MPU).

The GNSS receiver 10 according to the present embodiment has the hardware configuration illustrated in FIG. 2 and thus can perform various processing to be described later. Note that the hardware configuration illustrated in FIG. 2 is an example, and the GNSS receiver 10 according to the present embodiment may have any of other hardware configurations. For example, the GNSS receiver 10 according to the present embodiment may include an external recording medium, or may include an input device for setting, a display device for state confirmation, and the like. In addition, some functions may also be implemented by a programmable logic device such as a field-programmable gate array (FPGA), or software.

Server Apparatus 20
As illustrated in FIG. 3, the server apparatus 20 according to the present embodiment includes a communication I/F 21, a processor 22, and a memory device 23. The communication I/F 21 is an interface for connecting the server apparatus 20 to the communication means 30. The memory device 23 is any of various storage devices such as a RAM, a ROM, a flash memory, a hard disk drive (HDD), and a solid state drive (SSD). The processor 22 is any of various computation devices such as a CPU and a graphics processing unit (GPU).

The server apparatus 20 according to the present embodiment has the hardware configuration illustrated in FIG. 3 and thus can perform various processing to be described later. Note that the hardware configuration illustrated in FIG. 3 is an example, and the server apparatus 20 according to the present embodiment may have any of other hardware configurations. For example, the server apparatus 20 according to the present embodiment may include a plurality of processors 22 or may include a plurality of memory devices 23. The server apparatus 20 may include an external recording medium, or may include an input device for setting, a display device for state confirmation, and the like.

Functional Configuration

Figure 4:
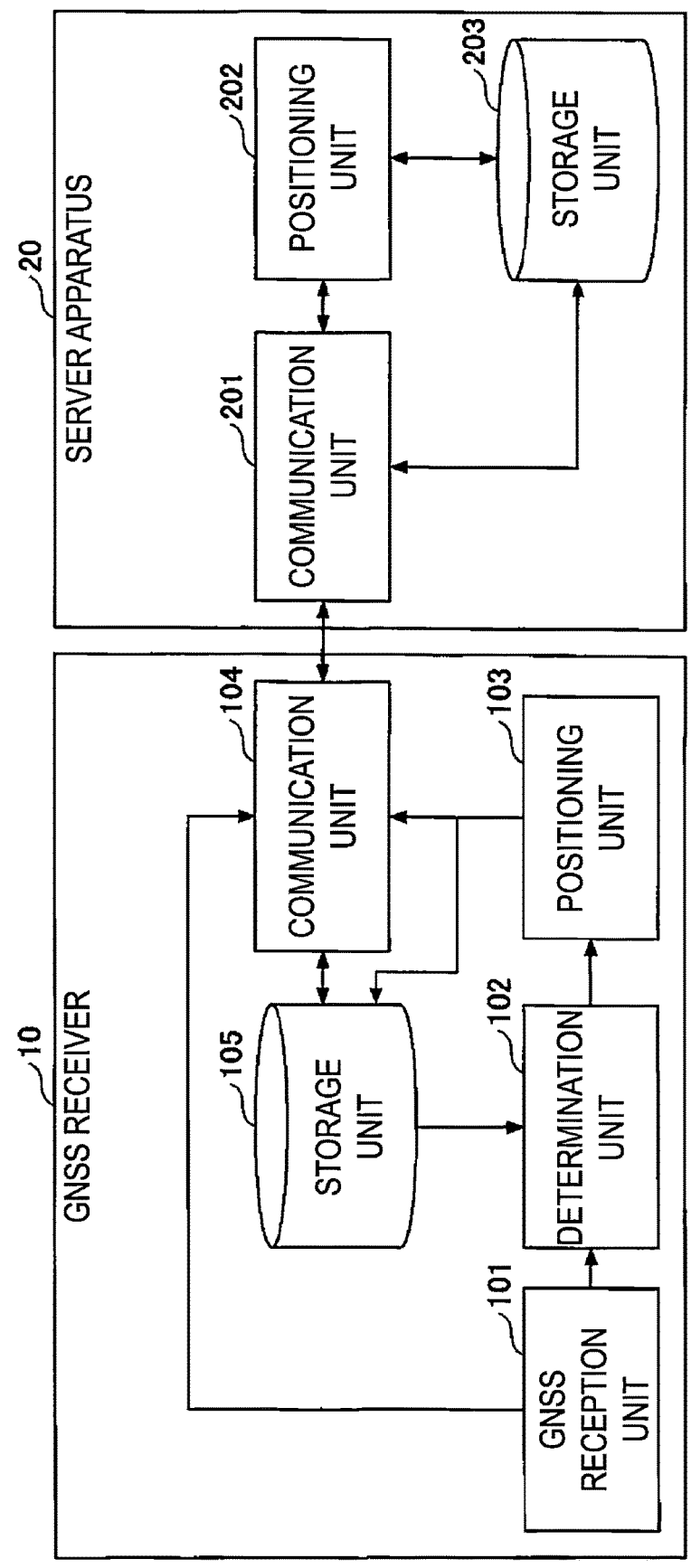
FIG. 4 is a diagram illustrating an example of a functional configuration of the positioning system according to the first embodiment.

Next, a functional configuration of the positioning system 1 according to the present embodiment will be described with reference to FIG. 4. FIG. 4 is a diagram illustrating an example of a functional configuration of the positioning system according to the first embodiment.

As illustrated in FIG. 4, the GNSS receiver 10 according to the present embodiment includes a GNSS reception unit 101, a determination unit 102, a positioning unit 103, and a communication unit 104. For example, these units are implemented by processing executed by the processor 15 in accordance with one or more programs stored in the memory device 14.

In addition, the GNSS receiver 10 according to the present embodiment includes a storage unit 105. The storage unit 105 can be implemented by using, for example, the memory device 14.

The GNSS reception unit 101 receives GNSS satellite signals via radio waves at a predetermined time interval (for example, every second). Note that the GNSS reception unit 101 generally receives GNSS satellite signals via radio waves from a plurality of GNSS satellites (for example, four or more GNSS satellites).

The determination unit 102 determines a positioning performer in accordance with, for example, a reception environment for radio waves from the GNSS satellites. Here, the determination is determining which one of the GNSS receiver 10 and the server apparatus 20 performs positioning based on a navigation satellite signal received by the GNSS receiver 10 which is a positioning target.

In a case where the determination unit 102 determines that a positioning performer is the GNSS receiver 10, the positioning unit 103 performs the positioning of the GNSS receiver 10 by, for example, code-based positioning using observational data obtained by signal processing of the GNSS satellite signals received by the GNSS reception unit 101 (the observational data may also be referred to as "raw data"), and the like. A positioning result obtained by the positioning unit 103 is stored, for example, in the storage unit 105. Note that the positioning unit 103 may perform the positioning of the GNSS receiver 10 by carrier-phase-based positioning.

The communication unit 104 transmits the observational data and the like to the server apparatus 20. At this time, the communication unit 104 transmits the observational data to the server apparatus 20, for example, in an RTCM format. That is, the communication unit 104 transmits the observational data to the server apparatus 20 at all times without storing the observational data in, for example, the storage unit 105 or the like. Note that, the communication unit 104 may transmit various information representing a reception state of the GNSS receiver 10 (for example, the intensity of reception, a signal-to-noise (SN) ratio, a carrier-to-noise (CN) ratio, and the like) to the server apparatus 20, in addition to the observational data. Hereinafter, various information representing these reception states will be also referred to as "reception state information," and in a case where "observational data and the like" are described, it is assumed that various information such as reception state information is also included in addition to observational data.

However, transmitting the observational data to the server apparatus 20 at all times is an example, and this is not limiting. For example, the communication unit 104 may transmit the observational data to the server apparatus 20 (without storing the observational data in the storage unit 105 or the like) only in a case where the determination unit 102 determines that a positioning performer is the server apparatus 20. In this case, a communication load between the GNSS receiver 10 and the server apparatus 20 is reduced.

Further, in a case that the determination unit 102 determines that a positioning performer is the server apparatus 20, the communication unit 104 transmits a positioning instruction to the server apparatus 20. Furthermore, in a case where a positioning result is transmitted from the server apparatus 20, the communication unit 104 receives the positioning result. At this time, the communication unit 104 receives the positioning result from the server apparatus 20, for example, in an RTCM format, or the like.

The storage unit 105 stores various information (for example, a positioning result of positioning performed by the positioning unit 103, a positioning result transmitted from the server apparatus 20, and the like).

As illustrated in FIG. 4, the server apparatus 20 according to the present embodiment includes a communication unit 201 and a positioning unit 202. For example, these units may be implemented by processing executed by the processor 22 in accordance with one or more programs stored in the memory device 23.

In addition, the server apparatus 20 according to the present embodiment includes a storage unit 203. The storage unit 203 can be implemented by using, for example, the memory device 23.

The communication unit 201 receives observational data and the like transmitted from the GNSS receiver 10, and receives a positioning instruction. In addition, the communication unit 201 transmits a positioning result obtained by the positioning unit 202 to the GNSS receiver 10.

The positioning unit 202 performs the positioning of the GNSS receiver 10 by, for example, carrier-phase-based positioning using the observational data received by the communication unit 201, and the like.

The storage unit 203 stores various information (for example, positioning results of positioning performed by the positioning unit 202, and the like). Note that the positioning results obtained by the positioning unit 202 may be stored in the storage unit 203. In a case where the server apparatus 20 collects location information and time information of the GNSS receiver 10, the storage unit 203 may further store positioning results of positioning performed by the GNSS receiver 10.

Details of Processing

Figure 5:
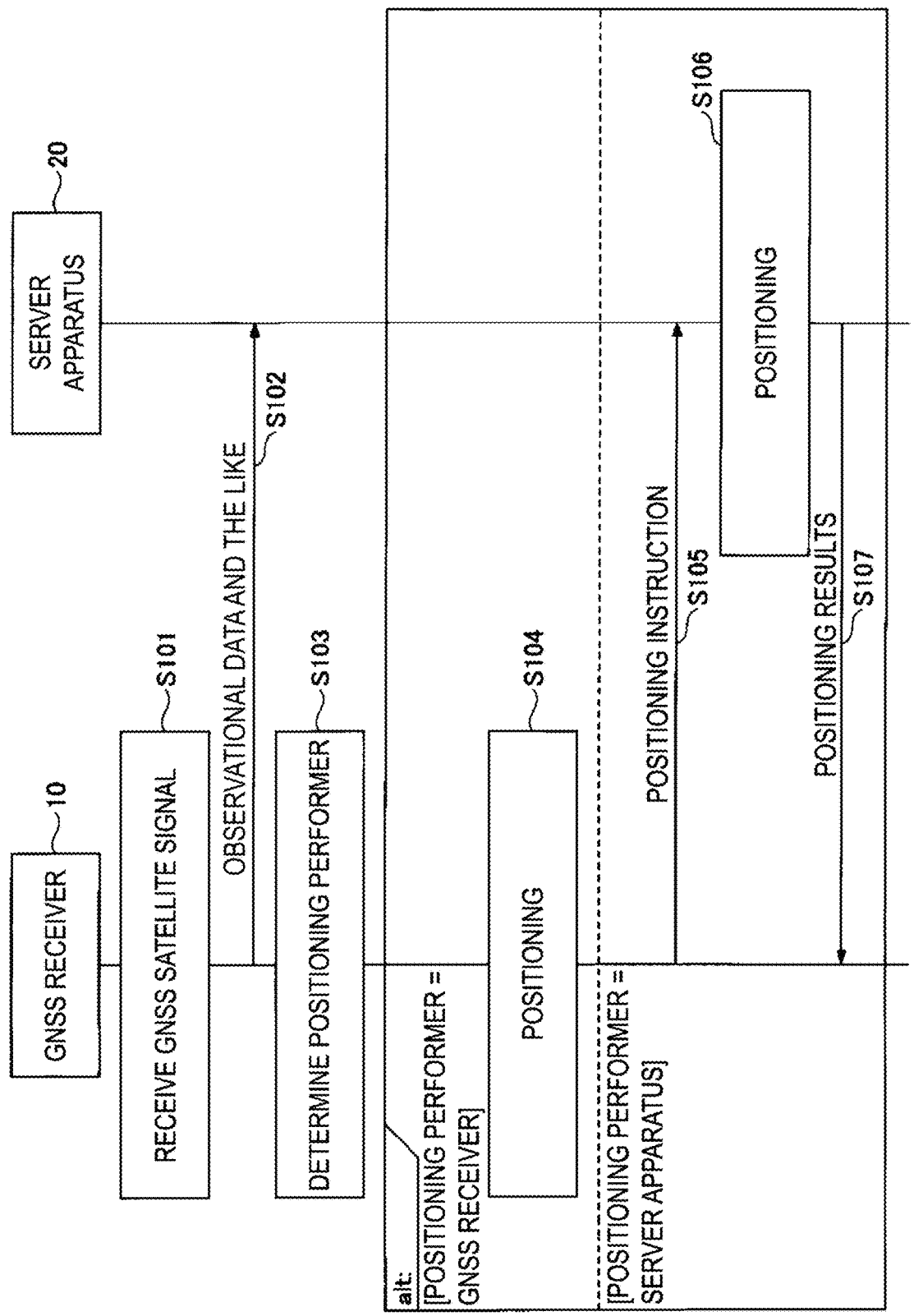
FIG. 5 is a sequence diagram illustrating an example of positioning processing according to the first embodiment.

Next, processing (positioning processing) in a case where the positioning of the GNSS receiver 10 is performed by the positioning system 1 according to the present embodiment will be described with reference to FIG. 5. FIG. 5 is a sequence diagram illustrating an example of positioning processing according to the first embodiment.

First, the GNSS reception unit 101 of the GNSS receiver 10 receives GNSS satellite signals via radio waves at a predetermined time interval (for example, every second) (step S101).

Next, the communication unit 104 of the GNSS receiver 10 transmits observational data and the like to the server apparatus 20 (step S102).

Next, the determination unit 102 of the GNSS receiver 10 determines whether or not a positioning performer is the GNSS receiver 10 or the server apparatus 20 (step S103). For example, the determination unit 102 may determine a positioning performer so that the GNSS receiver 10 is the positioning performer in a case where a reception environment for GNSS satellite signals is an open sky environment, and the server apparatus 20 is the positioning performer in a case where a reception environment for GNSS satellite signals is an urban canyon environment. Note that the open sky environment is a reception environment in which there is no structure such as a building or a tree in the vicinity of a reception position. The urban canyon environment is a reception environment in which there is a structure such as a building or a tree in the vicinity of a reception position. In the urban canyon environment, the number of visible satellites may be limited unlike the open sky environment, and thus the accuracy of positioning may generally deteriorate. Here, the visible satellite represents a GNSS satellite capable of receiving radio waves as direct waves. For this reason, in the case of an urban canyon environment, a more accurate positioning can be performed by performing positioning by carrier-phase-based positioning in the server apparatus 20.

Here, whether a reception environment for GNSS satellite signals is an open sky environment or an urban canyon environment is determined by, for example, any one of the following determination methods, that is, a determination method 1 and a determination method 2 (or a combination of the determination method 1 and the determination method 2).

Determination method 1: The determination unit 102 determines which one of an open sky environment and an urban canyon environment a reception environment is, by using a ratio of the number of GNSS satellite signals having a signal-to-noise ratio (SN ratio) being equal to or greater than a predetermined first threshold value to the number of GNSS satellite signals received by the GNSS reception unit 101. At this time, in a case where the ratio is equal to or greater than a predetermined second threshold value, the reception environment is determined to be an open sky environment, and otherwise, the reception environment is determined to be an urban canyon environment. This is because the number of GNSS satellite signals received as direct waves is greater in the open sky environment than in the urban canyon environment, and the GNSS satellite signals received as direct waves often have a relatively large SN ratio as compared with GNSS satellite signals reflected and diffracted by a structure such as a building. Note that a carrier-to-noise ratio (CN ratio) may be used instead of the SN ratio.

Determination method 2: The determination unit 102 determines which one of an open sky environment and an urban canyon environment a reception environment is, in accordance with an area to which immediately previous positioning results (for example, positioning results of positioning performed one second before, or the like) or positioning results obtained at a predetermined time interval in the past (for example, positioning results of positioning performed for several minutes in the past) belong. Here, it is assumed that information indicating which one of an open sky environment and an urban canyon environment is indicated by the area is associated with the area at each time (hereinafter, this information is also referred to as "environment type information"). Note that, for example, any two-dimensional region or three-dimensional region such as a geographical section is set to be an area.

At this time, the determination unit 102 determines which one of an open sky environment or an urban canyon environment the reception environment is, based on environment type information associated with an area to which immediately previous positioning results or positioning results obtained at a predetermined time interval in the past belong.

Here, when an area and environment type information at each time are associated with each other, which one of an open sky environment and an urban canyon environment is indicated by the environment type information may be determined, for example, by ray tracing simulation performed by a GNSS satellite signal simulator or may be determined according to actual results data indicating past positioning results in the area, and the like. Additionally, in addition to such determination based on ray tracing simulation and actual results data (that is, determination based on grounds such as simulation results or actual results), a user may determine either an open sky environment or an urban canyon environment by himself/herself. Note that actual results data indicating past positioning results of various positioning targets, and the like may be collected through, for example, crowd sourcing.

In a case where either an open sky environment or an urban canyon environment is determined through ray tracing simulation, the determination unit 102 simulates a reception state of a visible satellite or a multipath generation situation in an area at a arbitrary time by using, for example, orbit information of a GNSS satellite (for example, an almanac, an ephemeris, or the like) and geospatial information in a corresponding area (for example, structure information or the like) to determine which one of the open sky environment and the urban canyon environment is indicated by the area at each time. Note that a multipath is also referred to as multiple wave propagation, which indicates a phenomenon in which two or more propagation paths are generated at a reception position due to reflection and diffraction of radio waves received from a GNSS satellite.

In a case where either an open sky environment or an urban canyon environment is determined in accordance with actual results data, for example, the determination unit 102 uses an actual result in which a fix solution (convergence solution) is obtained by carrier-phase-based positioning to determine which one of the open sky environment and the urban canyon environment is indicated by the area at each time. It is easier to obtain a fix solution in an open sky environment, while it is harder to obtain a fix solution in an urban canyon environment. Thus, for example, a ratio at which a fix solutions is obtained in the area is calculated at a predetermined time interval and the calculated ratio is compared with a predetermined third threshold value to determine which one of the open sky environment and the urban canyon environment is indicated by the area at each time at the predetermined time interval.

Alternatively, in a case where either an open sky environment or an urban canyon environment is determined in accordance with actual results data, for example, the determination unit 102 compares a ratio at which an actual positioning result is away from a road by a predetermined distance or more with a predetermined fourth threshold value at a predetermined time interval by using the actual positioning result and map data to determine which one of the open sky environment and the urban canyon environment is indicated by the area at each time at the predetermined time interval. This is because a vehicle or a pedestrian travels or walks on a road, and the accuracy of location information deteriorates more as the degree of urban canyon environment increases, which results in an error between the actual position of the vehicle or pedestrian and a position indicated by a positioning result.

Description will return to FIG. 5. In a case where a positioning performer is determined to be the GNSS receiver 10 in step S103, the positioning unit 103 of the GNSS receiver 10 performs positioning of the GNSS receiver 10 which is a positioning target by, for example, code-based positioning using observational data and the like obtained through signal processing of GNSS satellite signals received in step S101 described above (step S104). Note that positioning results obtained by the positioning unit 103 are stored in, for example, the storage unit 105.

On the other hand, in a case where a positioning performer is determined to be the server apparatus 20 in step S103 described above, the communication unit 104 of the GNSS receiver 10 transmits a positioning instruction to the server apparatus 20 (step S105).

When the positioning unit 202 of the server apparatus 20 receives the positioning instruction from the communication unit 201, the positioning unit 202 performs positioning of the GNSS receiver 10 which is a positioning target by, for example, carrier-phase-based positioning using the observational data and the like transmitted from the GNSS receiver 10 in step S102 described above (step S106). At this time, a propagation delay occurs in association with the transmission of the observational data from the GNSS receiver 10 to the server apparatus 20, but this affects a time offset value in positioning computation performed in the server apparatus 20 but does not affect positioning accuracy. Note that the positioning unit 202 may perform positioning, for example, by code-based positioning using observational data and the like and then carrier-phase-based positioning using positioning results of the code-based positioning as initial coordinates.

Then, the communication unit 201 of the server apparatus 20 transmits the positioning results in step S106 described above (that is, four parameters (x, y, z)) to the GNSS receiver 10 (step S107). Thereby, the positioning of the position of the GNSS receiver 10 is performed. However, step S107 described above may not necessarily be executed (that is, the positioning results obtained in the server apparatus 20 may not be transmitted to the GNSS receiver 10).

Another Example of Positioning Processing

Figure 6:
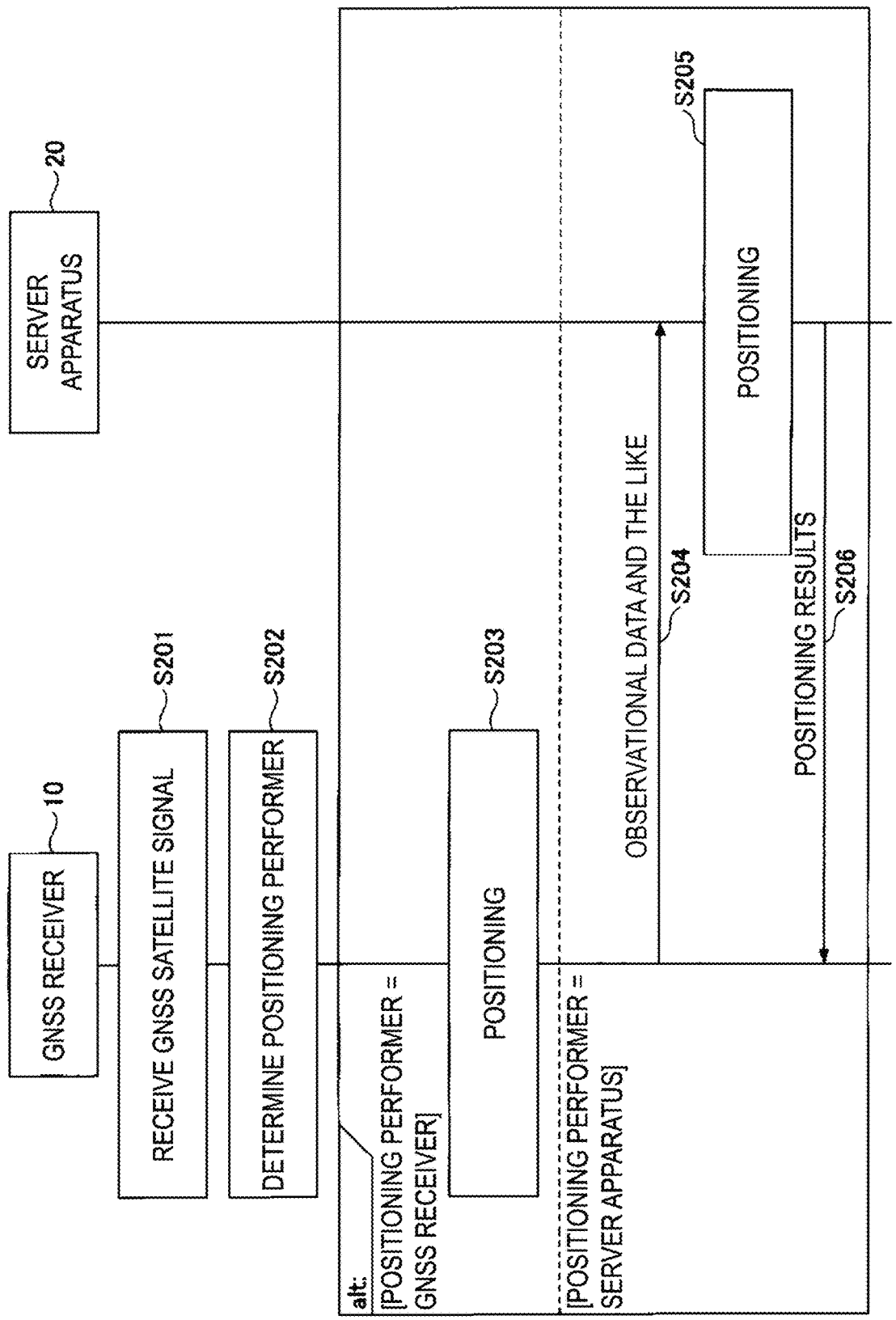
FIG. 6 is a sequence diagram illustrating another example of positioning processing according to the first embodiment.

Next, as another example of the above-described positioning processing, the following example will be described with reference to FIG. 6. Here, in the example, observational data and the like are transmitted to the server apparatus 20 only in a case where the determination unit 102 of the GNSS receiver 10 determines that a positioning performer is the server apparatus 20. FIG. 6 is a sequence diagram illustrating another example of positioning processing according to the first embodiment. As described above, in this case, a communication load between the GNSS receiver 10 and the server apparatus 20 is reduced.

First, the GNSS reception unit 101 of the GNSS receiver 10 receives a GNSS satellite signal via radio waves at a predetermined time interval (for example, every second) (step S201).

Next, similarly to step S103 in FIG. 5, the determination unit 102 of the GNSS receiver 10 determines whether a positioning performer is the GNSS receiver 10 or the server apparatus 20 (step S202).

In a case where a positioning performer is determined to be the GNSS receiver 10 in step S202 described above, the positioning unit 103 of the GNSS receiver 10 performs the positioning of the GNSS receiver 10 using observational data and the like, similar to step S104 in FIG. 5 (step S203).

On the other hand, in a case where a positioning performer is determined to be the server apparatus 20 in step S202 described above, the communication unit 104 of the GNSS receiver 10 transmits observational data and the like to the server apparatus 20 (step S204). In this case, the communication unit 104 may transmit a positioning instruction to the server apparatus 20 along with the observational data and the like.

When the positioning unit 202 of the server apparatus 20 receives the observational data and the like by the communication unit 201, the positioning unit 202 performs the positioning of the GNSS receiver 10 which is a positioning target by, for example, carrier-phase-based positioning using the observational data and the like, similar to step S106 in FIG. 5 (step S205).

Then, similarly to step S107 in FIG. 5, the communication unit 201 of the server apparatus 20 transmits positioning results in step S205 described above to the GNSS receiver 10 (step S206). Note that step S206 may not necessarily be executed.

Specification of Region in which Positioning Target is Present Here, in order to perform positioning with higher accuracy in step S106 and step S205 described above, the positioning unit 202 may specify a region in which a positioning target (that is, the GNSS receiver 10) is present (hereinafter, this region is also referred to as a "candidate region"), for example, before the positioning unit performs positioning by carrier-phase-based positioning. Thereby, it is possible to perform positioning with higher accuracy by limiting the position of a positioning target within the candidate region.

More specifically, the positioning unit 202 specifies the attribute of the positioning target (for example, either a vehicle or a pedestrian) from, for example, the time variation of the past positioning results of the positioning target. Then, the positioning unit 202 specifies a portion of a region of a road specified from past positioning results as a candidate region using the past positioning results and geospatial information in accordance with the specified attribute. That is, in a case where the attribute of the positioning target is a vehicle, the positioning unit 202 specifies a roadway on a side in a moving direction of the vehicle, among roadways of the road specified from the past positioning results (that is, a road specified as a road on which the vehicle is traveling), as a candidate region. Additionally, in a case where the attribute of the positioning target is a pedestrian, the positioning unit 202 specifies a sidewalk in the road specified from the past positioning results (that is, a road specified as a road along which the pedestrian is walking) as a candidate region. Here, the road on which the vehicle is traveling and the road on which the pedestrian is walking can be specified, for example, by comparing link information included in road network information with the past positioning results (that is, past location information). Additionally, in a case where information indicating the range of a roadway or a sidewalk is included in the link information, the positioning unit 202 may specify the roadway and the sidewalk of the above-described road from the link information. The positioning unit 202 may specify the roadway and the sidewalk from information obtained by modeling the road (for example, 2D or 3D data of the road, or the like). Note that the road network information and the information obtained by modeling the road may be acquired from, for example, an external system or the like.

Figure 7:
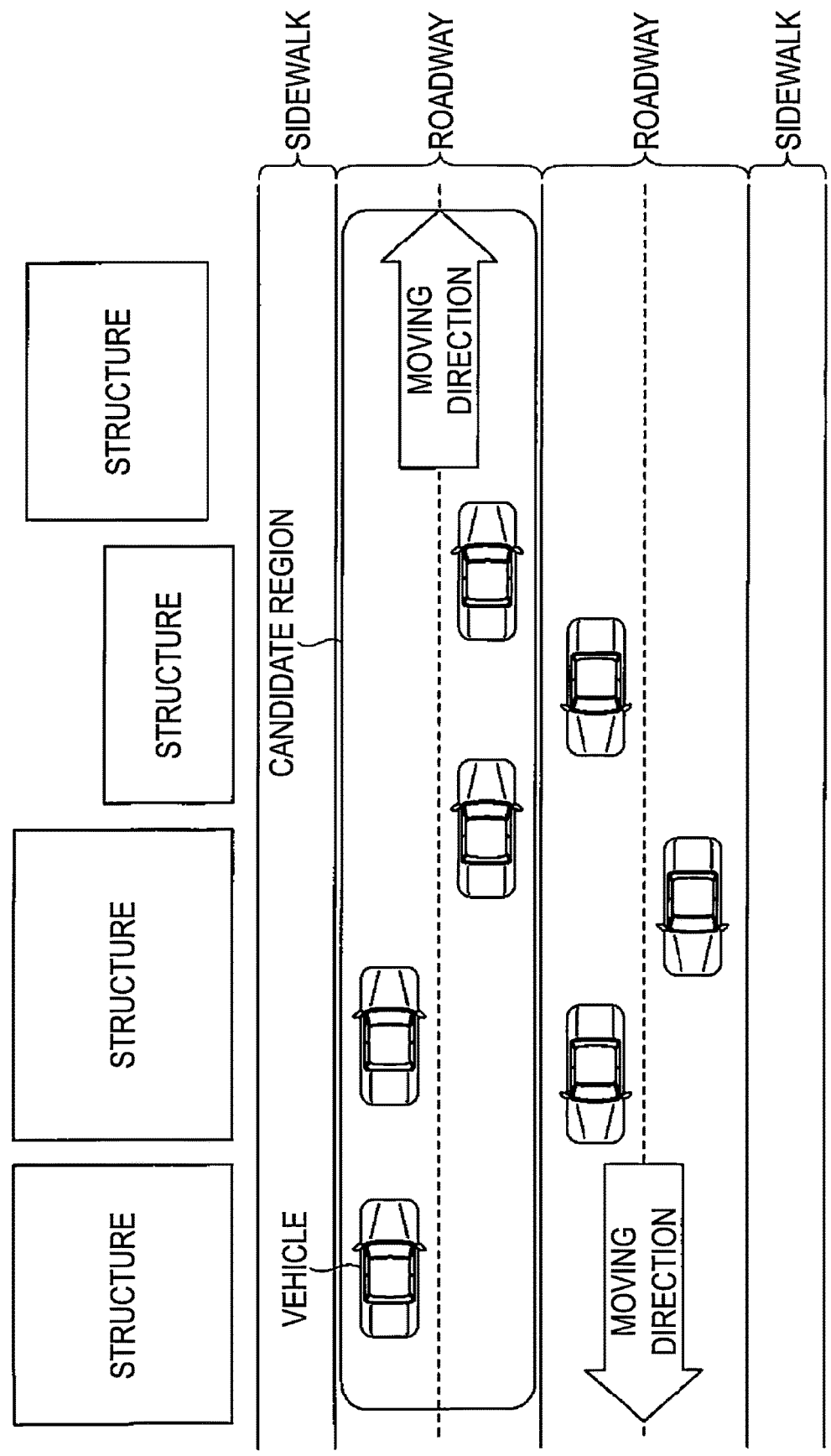
FIG. 7 is a diagram illustrating an example of a case where a candidate region in which a positioning target is present is specified.

As an example, FIG. 7 illustrates a case where a roadway on a side in a moving direction of a vehicle which is a positioning target, among roadways of a road, is specified as a candidate region. As illustrated in FIG. 7, it is possible to perform positioning with higher accuracy by specifying a roadway on a side in a moving direction as a candidate region and limiting the position of a positioning target within the candidate region to perform positioning. Note that the attribute of the positioning target is not limited to a vehicle or a pedestrian, and may include, for example, a bicycle, a motorcycle, a construction machine, an agricultural machine, and the like.

Validity Determination of Positioning Results Using Geospatial Information Additionally, in step S106 and step S205 described above, the positioning unit 202 may determine the validity of a positioning result obtained after the positioning of a positioning target is performed. For example, the positioning unit 202 may perform the positioning of the positioning target by code-based positioning using observational data and the like and then determine the validity of a positioning result of the code-based positioning, and then may perform positioning of the positioning target by carrier-phase-based positioning using the positioning result of the code-based positioning as initial coordinates only in a case where the positioning result of the code-based positioning is determined to be valid. Thereby, it is possible to perform positioning with higher accuracy.

Figure 8:
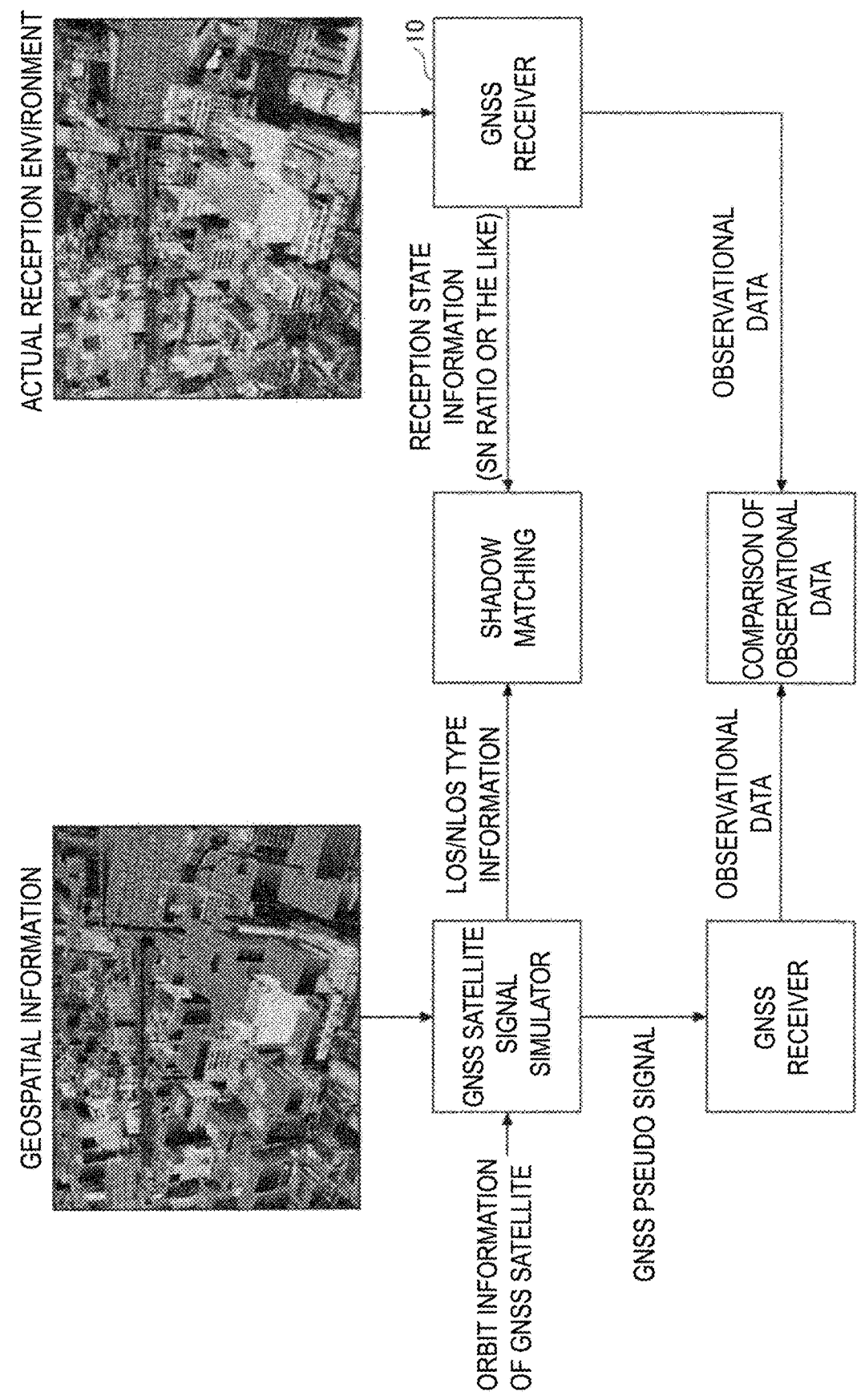
FIG. 8 is a diagram illustrating an example of validity determination of a positioning result using geospatial information.

Here, examples of methods of determining the validity of a positioning result include shadow matching and comparison between pieces of observational data. These methods will be described with reference to FIG. 8. FIG. 8 is a diagram illustrating an example of validity determination of a positioning result using geospatial information. Hereinafter, a case where the validity of a positioning result of code-based positioning is determined will be described.

As illustrated in FIG. 8, in the shadow matching, first, the positioning unit 202 performs ray trace simulation at a corresponding time at a position indicated by a positioning result by a GNSS satellite signal simulator by using a positioning result of code-based positioning, geospatial information, and orbit information of a GNSS satellite to determine a line of sight (LOS)/non line of sight (NLOS) type of the GNSS satellite at the position and the time. Then, the positioning unit 202 determines the validity of the positioning result of the code-based positioning by comparing information indicating the LOS/NLOS type with reception state information (an SN ratio, a CN ratio, or the like) received from the GNSS receiver 10.

In a case where the LOS/NLOS type of the GNSS satellite is "LOS", radio waves from the GNSS satellite are received by the GNSS receiver 10 as direct waves, and thus an SN ratio (or a CN ratio) increases as compared with a case where the LOS/NLOS type is "NLOS". For this reason, the positioning unit 202 can determine the validity of the positioning result of the code-based positioning by determining whether or not a point to be described below is satisfied. Here, the point is regarding, for example, whether an SN ratio (or a CN ratio) of a GNSS satellite signal corresponding to a GNSS satellite in which an LOS/NLOS type is "LOS" is relatively large, and an SN ratio (or a CN ratio) of a GNSS satellite signal corresponding to a GNSS satellite in which an LOS/NLOS type is "NLOS" is relatively small.

In addition, as illustrated in FIG. 8, in the comparison of the observational data, first, the positioning unit 202 outputs a pseudo GNSS satellite signal received at a corresponding time at a position indicated by a positioning result of code-based positioning by a GNSS satellite signal simulator, using the positioning result, geospatial information, and orbit information of a GNSS satellite. The pseudo GNSS satellite signal is also referred to as a "GNSS pseudo signal".

Then, the positioning unit 202 determines the validity of a positioning result of code-based positioning by comparing observational data obtained by inputting a GNSS pseudo signal to the GNSS receiver included in the server apparatus 20 (hereinafter, also referred to as "pseudo observational data") with observational data received from the GNSS receiver 10 (hereinafter, also referred to as "actual observational data"). Thereby, it is possible to more accurately determine validity, inclusive of the state of occurrence of a multipath. For example, the positioning unit 202 determines that the positioning result of the code-based positioning is not valid in a case where a multipath is generated in the pseudo observational data, while a multipath is generated in the actual observational data, or in a case where a multipath is generated in the actual observational data, while a multipath is not generated in the pseudo observational data.

Second Embodiment

Hereinafter, a second embodiment will be described. In the second embodiment, a case where a server apparatus 20 determines a positioning performer will be described. Note that, in the second embodiment, differences from the first embodiment will be mainly described, components similar to those in the first embodiment will be denoted by the same reference numerals and signs, and the description thereof will be omitted.

Functional Configuration

Figure 9:
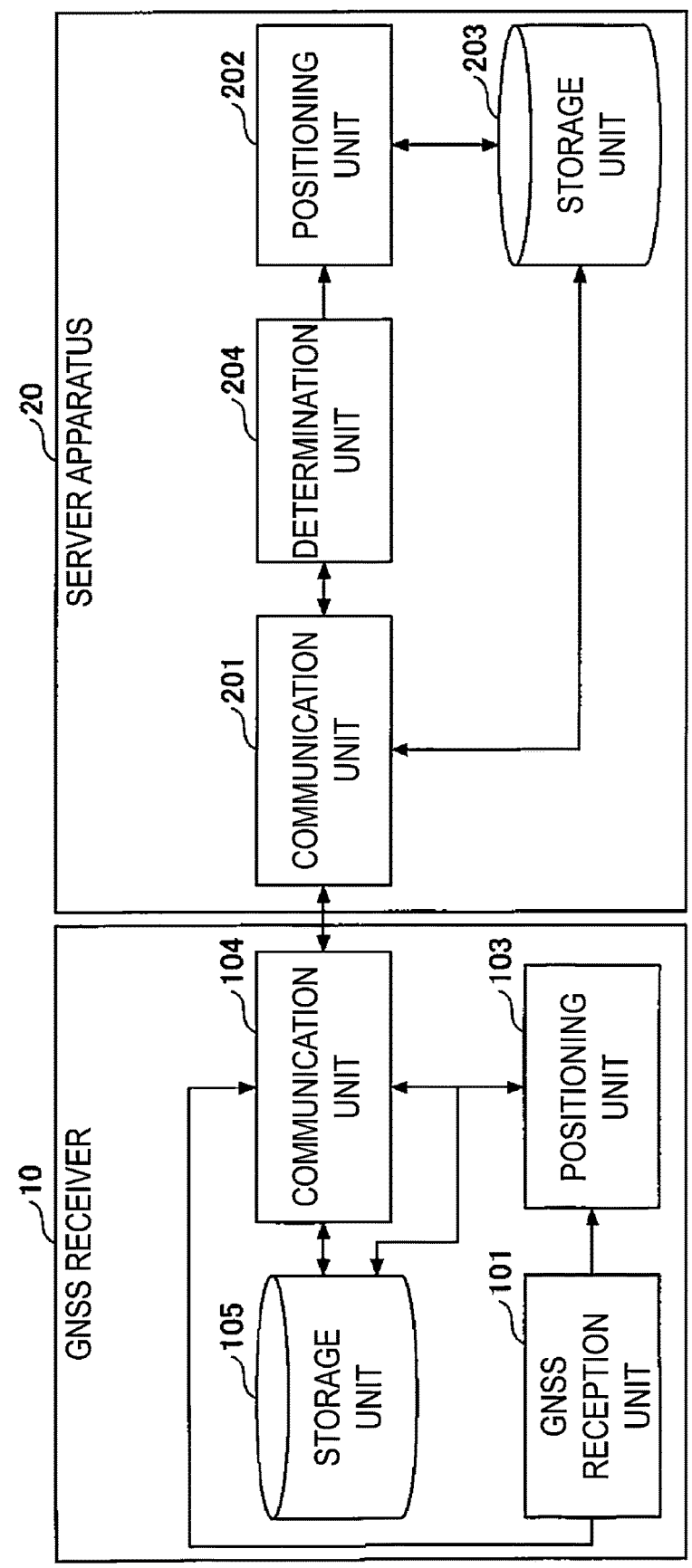
FIG. 9 is a diagram illustrating an example of a functional configuration of a positioning system according to a second embodiment.

First, a functional configuration of a positioning system 1 according to the present embodiment will be described with reference to FIG. 9. FIG. 9 is a diagram illustrating an example of a functional configuration of the positioning system 1 according to the second embodiment.

As illustrated in FIG. 9, a GNSS receiver 10 according to the present embodiment is different from that in the first embodiment and does not include a determination unit 102. In addition, the server apparatus 20 according to the present embodiment is different from that in the first embodiment and includes a determination unit 204.

The determination unit 204 determines a positioning performer from observational data and the like transmitted from the GNSS receiver 10. That is, the determination unit 204 determines a positioning performer in accordance with a reception environment for radio waves in the GNSS receiver 10, and the like.

Details of Processing

Figure 10:
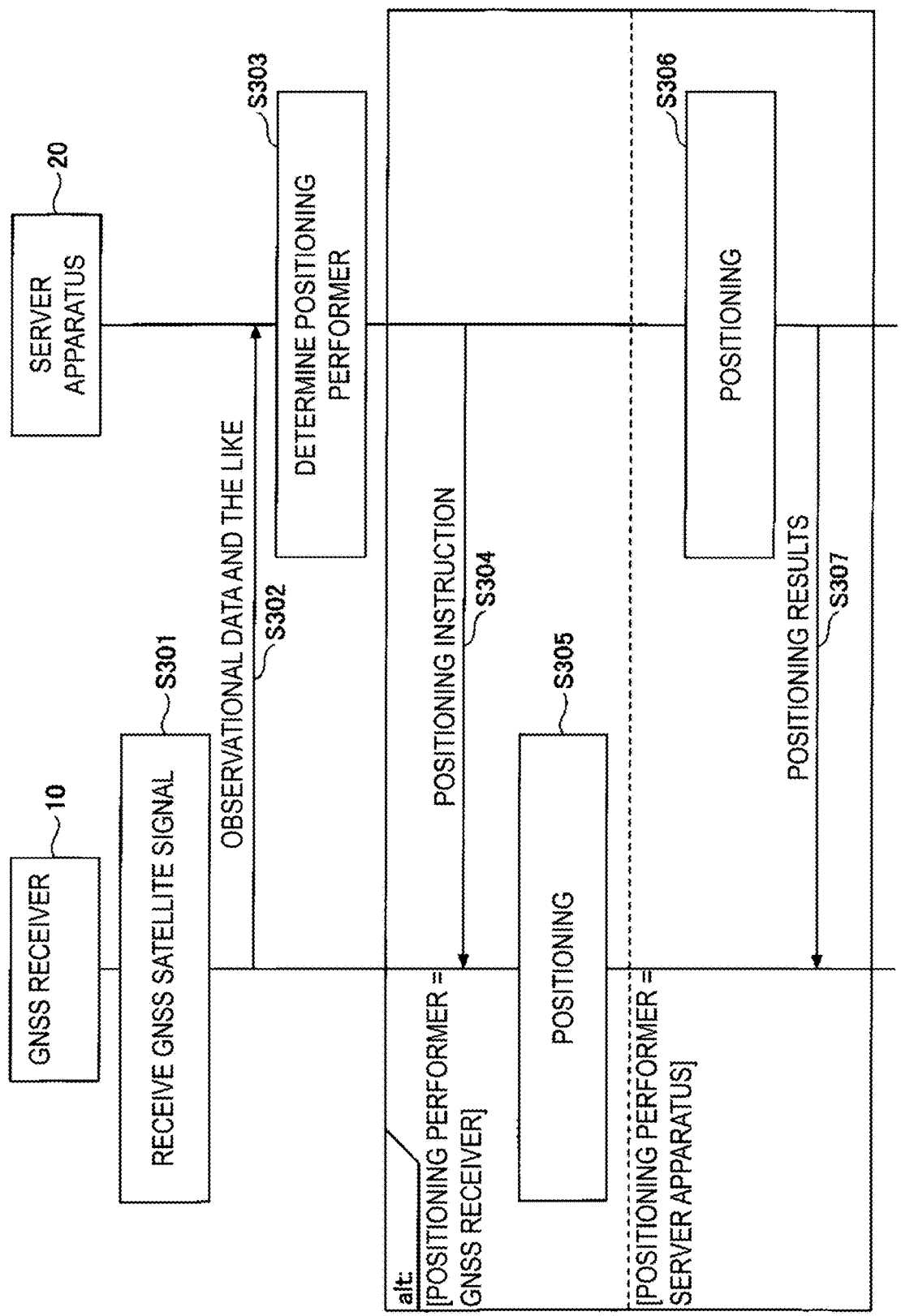
FIG. 10 is a sequence diagram illustrating an example of positioning processing according to the second embodiment.

Next, positioning processing according to the present embodiment will be described with reference to FIG. 10. FIG. 10 is a sequence diagram illustrating an example of positioning processing according to the second embodiment.

First, a GNSS reception unit 101 of the GNSS receiver 10 receives a GNSS satellite signal via radio waves at a predetermined time interval (for example, every second) (step S301).

Next, the communication unit 104 of the GNSS receiver 10 transmits observational data and the like to the server apparatus 20 (step S302).

When the observational data and the like are received by a communication unit 201, the determination unit 204 of the server apparatus 20 determines whether a positioning performer is the GNSS receiver 10 or the server apparatus 20 (step S303). Note that a determination method similar to that in step S103 in FIG. 5 is used.

In a case where a positioning performer is determined to be the GNSS receiver 10 in step S303 described above, the communication unit 201 of the server apparatus 20 transmits a positioning instruction to the GNSS receiver 10 (step S304).

Then, when the positioning instruction is received by the communication unit 104, a positioning unit 103 of the GNSS receiver 10 performs the positioning of the GNSS receiver 10 which is a positioning target by, for example, code-based positioning using the observational data and the like obtained by the signal processing of the GNSS satellite signal received in step S301 described above (step S305).

On the other hand, in a case where a positioning performer is determined to be the server apparatus 20 in step S303 described above, the positioning unit 202 of the server apparatus 20 performs the positioning of the GNSS receiver 10 which is a positioning target by, for example, carrier-phase-based positioning using the observational data and the like transmitted from the GNSS receiver 10 in step S302 described above (step S306).

Then, the communication unit 201 of the server apparatus 20 transmits a positioning result of step S306 described above to the GNSS receiver 10 (step S307). Note that step S307 may not necessarily be executed.

Third Embodiment

Hereinafter, a third embodiment will be described. In the third embodiment, description will be given of a case where positioning based on carrier-phase-based positioning is started by both a GNSS receiver 10 and a server apparatus 20 but a fix solution is not obtained by the GNSS receiver 10 and thus a positioning result is acquired from the server apparatus 20. Note that, in the third embodiment, differences from the first embodiment will be mainly described, components similar to those in the first embodiment will be denoted by the same reference numerals and signs, and the description thereof will be omitted.

Functional Configuration

Figure 11:
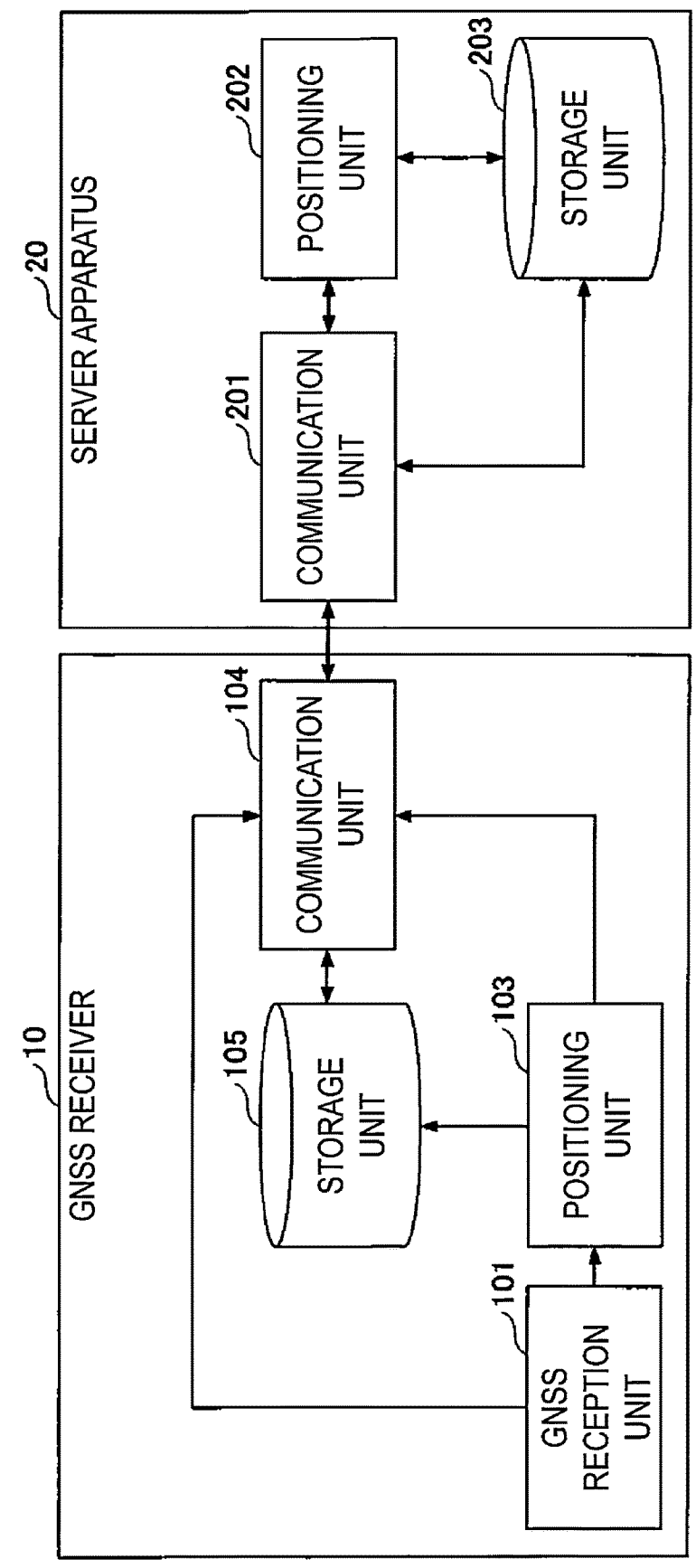
FIG. 11 is a diagram illustrating an example of a functional configuration of a positioning system according to a third embodiment.

First, a functional configuration of a positioning system 1 according to the present embodiment will be described with reference to FIG. 11. FIG. 11 is a diagram illustrating an example of a functional configuration of the positioning system 1 according to the third embodiment.

As illustrated in FIG. 11, the GNSS receiver 10 according to the present embodiment is different from that in the first embodiment and does not include a determination unit 102. In addition, a positioning unit 103 according to the present embodiment performs the positioning of the GNSS receiver 10 by carrier-phase-based positioning using observational data and the like.

Details of Processing

Figure 12:
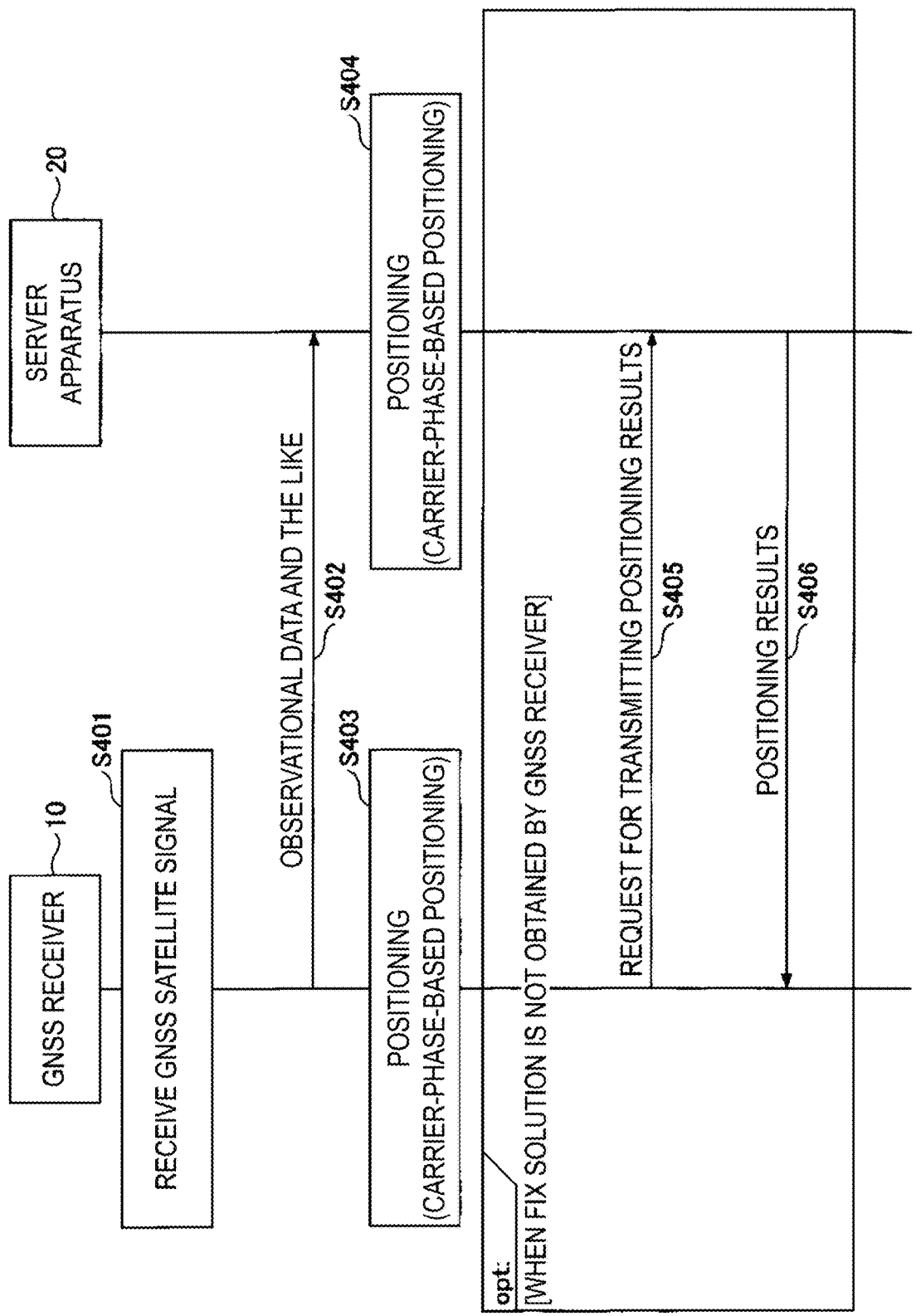
FIG. 12 is a sequence diagram illustrating an example of positioning processing according to the third embodiment.

Next, positioning processing according to the present embodiment will be described with reference to FIG. 12. FIG. 12 is a sequence diagram illustrating an example of positioning processing according to the second embodiment.

First, a GNSS reception unit 101 of the GNSS receiver 10 receives a GNSS satellite signal via radio waves at a predetermined time interval (for example, every second) (step S401).

Next, a communication unit 104 of the GNSS receiver 10 transmits observational data and the like obtained by signal processing of the GNSS satellite signal received in step S401 described above to the server apparatus 20 (step S402).

Next, the positioning unit 103 of the GNSS receiver 10 performs the positioning of the GNSS receiver 10 which is a positioning target by carrier-phase-based positioning by using the observational data and the like (step S403).

In addition, when a positioning unit 202 of the server apparatus 20 receives the observational data and the like by the communication unit 201, the positioning unit 202 performs positioning of the GNSS receiver 10 which is a positioning target by carrier-phase-based positioning using the observational data and the like (step S404). Note that, for example, the positioning unit 202 may perform the positioning of a positioning target by code-based positioning using the observational data and the like and then perform the positioning of a positioning target by carrier-phase-based positioning using a positioning result of the code-based positioning as initial coordinates.

Here, in a case where a fix solution is not obtained by the carrier-phase-based positioning in step S403 described above, the communication unit 104 of the GNSS receiver 10 transmits a request for transmitting the positioning result to the server apparatus 20 (step S405).

When the communication unit 201 of the server apparatus 20 receives the request for transmitting the positioning result, the communication unit 201 of the server apparatus 20 transmits a positioning result of the carrier-phase-based positioning in step S404 described above to the GNSS receiver 10 (step S406). Thereby, the positioning of the position of the GNSS receiver 10 and the synchronization of a time are performed. In this manner, in the present embodiment, in a case where carrier-phase-based positioning is performed by both the GNSS receiver 10 and the server apparatus 20 but a fix solution is not obtained by the GNSS receiver 10, the communication unit 201 transmits a positioning result obtained by the server apparatus 20 to the GNSS receiver 10. For this reason, in the positioning system 1 according to the present embodiment, it is possible to efficiently perform high-accuracy positioning in a case where carrier-phase-based positioning can also be performed in the GNSS receiver 10.

Fourth Embodiment

Hereinafter, a fourth embodiment will be described. As described above, an LOS/NLOS type is determined for each GNSS satellite in accordance with a reception environment, a reception time, and the like. Radio waves received from a GNSS satellite in which an LOS/NLOS type is "LOS" can be received as direct waves and such GNSS satellite is also referred to as a visible satellite. On the other hand, radio waves received from a GNSS satellite in which an LOS/NLOS type is "NLOS" may be received with reflection or diffraction, and such GNSS satellite is also referred to as an invisible satellite. For example, a multipath is generated in an urban canyon environment in which a visible satellite and an invisible satellite are present together, and thus positioning accuracy deteriorates. On the other hand, it is possible to reduce the influence of a multipath and prevent positioning accuracy from deteriorating by appropriately selecting a GNSS satellite signal used for positioning, but a relatively high computation capacity is often required to select the GNSS satellite signal. Consequently, in the fourth embodiment, a case where the server apparatus 20 selects a GNSS satellite signal and then the GNSS receiver 10 performs positioning using the selection results will be described. Note that, in the fourth embodiment, differences from the first embodiment will be mainly described, components similar to those in the first embodiment will be denoted by the same reference numerals and signs, and the description thereof will be omitted.

Note that, in the present embodiment, it is assumed that GNSS satellite signals can be received from four or more GNSS satellites regardless of a GNSS satellite signal received from a visible satellite or a GNSS satellite signal received from an invisible satellite, in an environment in which a structure for blocking the propagation of a GNSS satellite signal is present in the vicinity of the GNSS receiver 10. In addition, it is assumed that the GNSS receiver 10 that has received a GNSS satellite signal cannot grasp whether the GNSS satellite signal is a signal received from a visible satellite or a signal received from an invisible satellite.

Functional Configuration

Figure 13:
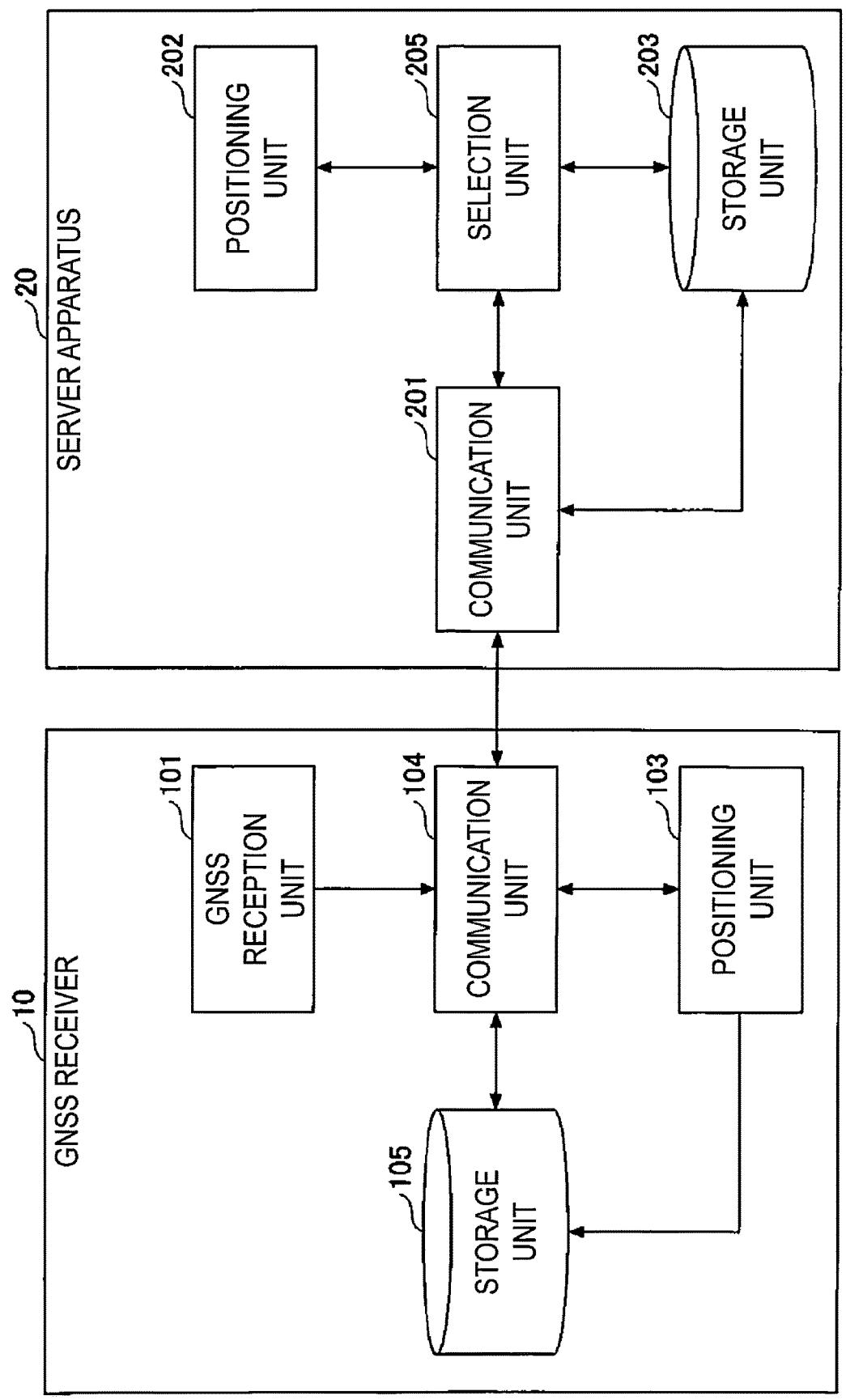
FIG. 13 is a diagram illustrating an example of a functional configuration of a positioning system according to a fourth embodiment.

First, an overall configuration of the positioning system 1 according to the present embodiment will be described with reference to FIG. 13. FIG. 13 is a diagram illustrating an example of a functional configuration of the positioning system 1 according to the fourth embodiment.

As illustrated in FIG. 13, the GNSS receiver 10 according to the present embodiment is different from that in the first embodiment and does not include a determination unit 102.

In addition, as illustrated in FIG. 13, the server apparatus 20 according to the present embodiment includes a selection unit 205. For example, the selection unit 205 may be implemented by processing executed by a processor 22 in accordance with one or more programs stored in a memory device 23.

When the selection unit 205 receives observational data and the like from the GNSS receiver 10, the selection unit 205 selects a GNSS satellite signal used for the positioning of the GNSS receiver 10 by using parameters stored in a storage unit 203. The selection result is transmitted to the GNSS receiver 10 by the communication unit 201. Thereby, in the GNSS receiver 10, the positioning of the GNSS receiver 10 which is a positioning target can be performed using observational data corresponding to the selection result. Note that the observational data corresponding to the selection result is observational data obtained by signal processing of the selected GNSS satellite signal.

Here, the parameters stored in the storage unit 203 are parameters for selecting a GNSS satellite signal to be used for the positioning of a positioning target, and will also be referred to as "selection parameters" below. The selection parameters include, for example, a threshold value of a CN ratio (hereinafter, also referred to as a "CN ratio threshold value"), an allowable error from an earliest time at which a GNSS satellite signal reaches certain coordinates, and the like. The selection parameters are set to any values in advance, for example, by a user or the like.

Details of Processing

Figure 14:
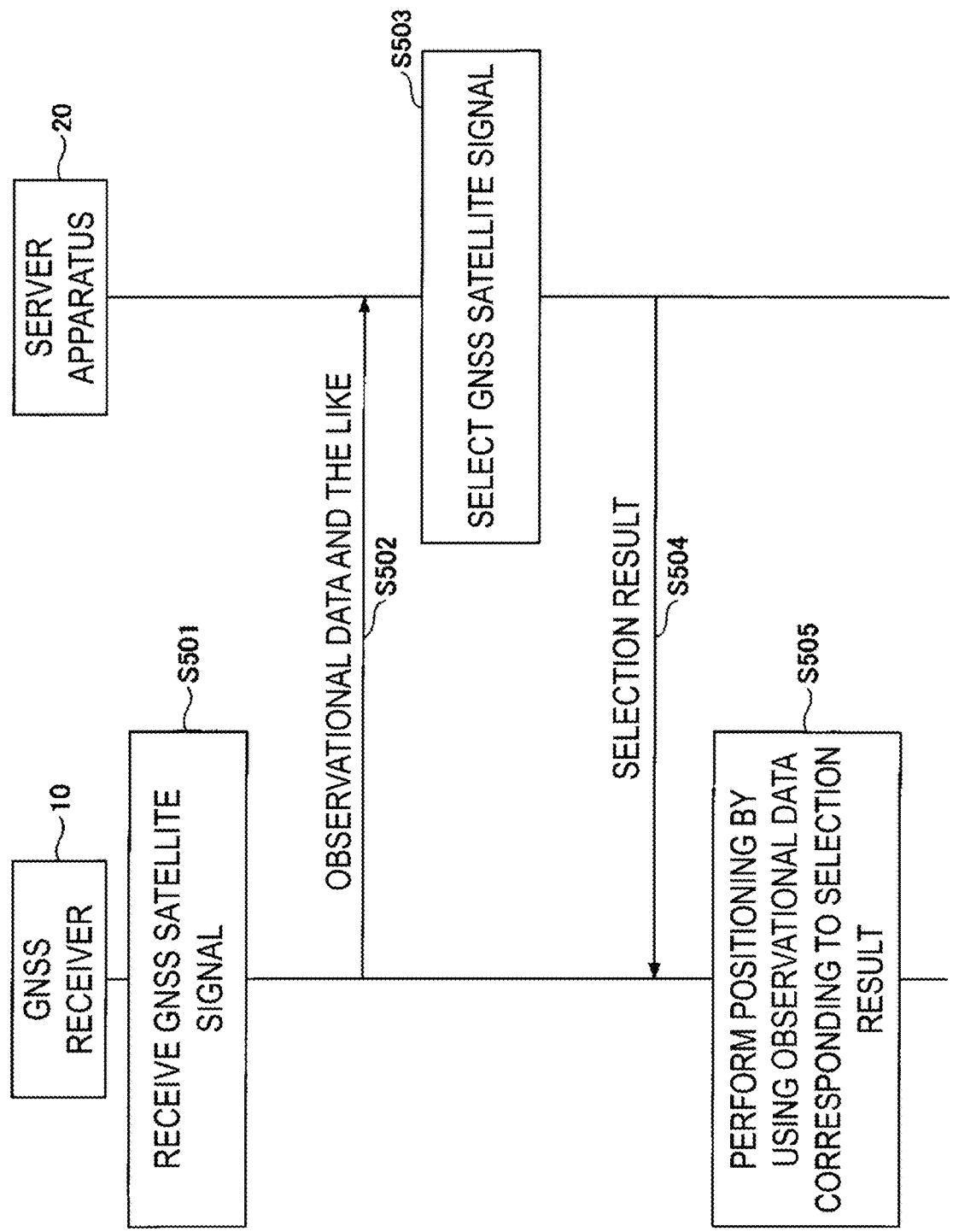
FIG. 14 is a sequence diagram illustrating an example of positioning processing according to the fourth embodiment.

Next, positioning processing according to the present embodiment will be described with reference to FIG. 14. FIG. 14 is a sequence diagram illustrating an example of positioning processing according to the fourth embodiment.

First, the GNSS reception unit 101 of the GNSS receiver 10 receives GNSS satellite signals via radio waves at a predetermined time interval (for example, every second) (step S501).

Next, a communication unit 104 of the GNSS receiver 10 transmits observational data and the like obtained by signal processing of the GNSS satellite signal received in step S501 described above to the server apparatus 20 (step S502).

When the selection unit 205 of the server apparatus 20 receives the observational data and the like by the communication unit 201, the selection unit 205 selects a GNSS satellite signal used for positioning from among GNSS satellite signals corresponding to the observational data (that is, GNSS satellite signals represented by information included in the observational data) by using the selection parameters stored in the storage unit 203 (step S503). Here, the server apparatus 20 selects a GNSS satellite signal by the following Steps 11 to 12 and Steps 21 to 26. Hereinafter, let N be the number of GNSS satellite signals received in step S501 described above, and assume that N pieces of observational data each including information represented by each of these N GNSS satellite signals are transmitted to the server apparatus 20 in step S502 described above.

Step 11) The selection unit 205 selects a GNSS satellite signal the CN ratio of which exceeds a CN ratio threshold value included in the selection parameters, from among the N GNSS satellite signals. At this time, in a case where the number of GNSS satellites corresponding to the selected GNSS satellite signal (that is, the GNSS satellites transmitting the selected GNSS satellite signal) is less than four, the selection unit 205 selects GNSS satellite signals in descending order of a CN ratio from among GNSS satellite signals the CN ratio of which is equal to or less than the CN ratio threshold value, and performs setting such that the number of GNSS satellites is four. Note that an SN ratio and a threshold value thereof may be used instead of the CN ratio and the CN ratio threshold value.

Step 12) Next, the positioning unit 202 performs code-based positioning by using the GNSS satellite signal selected in Step 11 described above. Hereinafter, coordinates indicated by a positioning result of the code-based positioning are also referred to as "initial coordinates".

Step 21) The selection unit 205 calculates an arrival time at which each of the N GNSS satellite signals reaches the initial coordinates by using the position of a GNSS satellite corresponding to each of the N GNSS satellite signals and a time at which each of the N GNSS satellite signals is transmitted. Note that the position of the GNSS satellite can be specified from orbit information of the GNSS satellite.

Step 22) Next, the selection unit 205 determines an earliest time among the arrival times calculated in Step 21 described above. Hereinafter, the determined time will be denoted by $T_0$.

Step 23) Next, the selection unit 205 sets $T_0+dT_1$ as a reference time by using an allowable error $dT_1$ included in the selection parameters.

Step 24) Next, the selection unit 205 selects a GNSS satellite signal whose arrival time calculated in Step 21 described above is earlier than the reference time $T_0+dT_1$.

Step 25) In a case where the number of GNSS satellites corresponding to each of the GNSS satellite signals selected in Step 24 described above is four or more, the positioning unit 202 performs code-based positioning using the GNSS satellite signal selected in Step 24 described above to update the initial coordinates with a positioning result of the code-based positioning.

Step 26) Next, the selection unit 205 determines whether or not a termination condition included in the selection parameters has been satisfied. Then, in a case where it is determined that the termination condition has not been satisfied, the selection unit 205 returns to Step 21 described above. Thereby, Steps 21 to 26 described above are repeatedly executed until the termination condition is satisfied.

On the other hand, in a case where it is determined that the termination condition has been satisfied, the selection unit 205 finally sets information indicating the GNSS satellite signal selected in Step 24 as a selection result.

Examples of the termination condition included in the selection parameters include "a predetermined period of time has elapsed since Step 21 has been executed first". Thereby, Steps 21 to 26 are repeatedly executed until a predetermined period of time has elapsed since Step 21 has been executed first. Examples of the termination condition include "the number of repetitions of Steps 21 to 26 has reached a predetermined number of times" or the like, or "a GNSS satellite corresponding to each of the GNSS satellite signals selected in Step 24 is not changed from the GNSS satellite corresponding to each of the GNSS satellite signals selected in Step 24 in the previous repetition" or the like.

Next, the communication unit 201 of the server apparatus 20 transmits the selection result in step S503 described above (that is, information indicating the GNSS satellite signal which is finally selected in Step 24) to the GNSS receiver 10 (step S504).

Then, when the positioning unit 103 of the GNSS receiver 10 receives the selection result by the communication unit 104, the positioning unit 103 of the GNSS receiver 10 performs the positioning of the GNSS receiver 10 which is a positioning target by code-based positioning (or carrier-phase-based positioning) by using observational data and the like corresponding to the selection result (step S505). Thereby, it is possible to perform high-accuracy positioning using observational data and the like corresponding to the GNSS satellite signal selected by the server apparatus 20. Note that, in the positioning processing illustrated in FIG. 14, a case where the GNSS receiver 10 performs positioning using the selection result obtained by the selection unit 205 has been described. However, this is not limiting, and the server apparatus 20 may perform positioning using the selection result. In this case, the server apparatus 20 executes step S503 described above and then performs positioning by the positioning unit 202 using the selection result obtained by the selection unit 205.

Another Example of Steps 21 to 26 (Part 1)

Here, the following Steps 21' to 27' may be executed instead of Steps 21 to 26 described above.

Step 21') The selection unit 205 calculates an arrival time at which each of the N GNSS satellite signals reaches the initial coordinates by using the position of a GNSS satellite corresponding to each of the N GNSS satellite signals and a time at which each of the N GNSS satellite signals is transmitted.

Step 22') Next, the selection unit 205 calculates an average value of the arrival times calculated in Step 21' described above for each of NCM combinations for choosing M GNSS satellite signals (here, N>M) from a set of the N GNSS satellite signals.

Step 23') Next, the selection unit 205 determines an earliest time among the average values calculated in Step 22' described above. Hereinafter, the determined time will be denoted by $T_0$.

Step 24') Next, the selection unit 205 sets $T_0+dT_2$ as a reference time by using an allowable error $dT_2$ included in the selection parameters.

Step 25') Next, the selection unit 205 selects a GNSS satellite signal whose arrival time calculated in Step 21' described above is earlier than the reference time $T_0+dT_2$.

Step 26') In a case where the number of GNSS satellites corresponding to each of the GNSS satellite signals selected in Step 25' described above is four or more, the positioning unit 202 performs code-based positioning using the GNSS satellite signal selected in Step 25' described above to update the initial coordinates with a positioning result of the code-based positioning.

Step 27') Next, the selection unit 205 determines whether or not a termination condition included in the selection parameters has been satisfied. Then, in a case where it is determined that the termination condition has not been satisfied, the selection unit 205 returns to Step 21' described above. Thereby, Steps 21' to 27' described above are repeatedly executed until the termination condition is satisfied.

On the other hand, in a case where it is determined that the termination condition has been satisfied, information indicating the GNSS satellite signal selected in Step 25' is finally set as a selection result.

Examples of the termination condition included in the selection parameters include "a predetermined period of time has elapsed since Step 21' has been executed first", "the number of repetitions of Steps 21' to 27' has reached a predetermined number of times", "a GNSS satellite corresponding to each of the GNSS satellite signals selected in Step 25' is not changed from the GNSS satellite corresponding to each of the GNSS satellite signals selected in Step 25' in the previous repetition", or the like.

Another Example of Steps 21 to 26 (Part 2) In addition, the following Steps 21" to 27" may be executed instead of Steps 21 to 26 described above.

Step 21") The selection unit 205 calculates an arrival time at which each of the N GNSS satellite signals reaches the initial coordinates by using the position of a GNSS satellite corresponding to each of the N GNSS satellite signals and a time at which each of the N GNSS satellite signals is transmitted.

Step 22") Next, the selection unit 205 calculates an average value of the arrival times calculated in Step 21" described above for each of NCM combinations for choosing M GNSS satellite signals (here, N>M, and M is 4 or greater) from a set of the N GNSS satellite signals.

Step 23") Next, the selection unit 205 determines an earliest time among the average values calculated in Step 22" described above. Hereinafter, the determined time will be denoted by $T_0$.

Step 24") Next, the selection unit 205 sets $T_0+dT_3$ as a reference time by using an allowable error $dT_3$ included in the selection parameters.

Step 25") Next, the selection unit 205 selects a GNSS satellite signal included in a combination corresponding to an average value which is earlier than the reference time $T_0+dT_3$ among the average values calculated in Step 22" described above.

Step 26") The positioning unit 202 performs code-based positioning using the GNSS satellite signal selected in Step 25" described above to update the initial coordinates with a positioning result of the code-based positioning.

Step 27") Next, the selection unit 205 determines whether or not a termination condition included in the selection parameters has been satisfied. Then, in a case where it is determined that the termination condition has not been satisfied, the selection unit 205 returns to Step 21" described above. Thereby, Steps 21" to 27" described above are repeatedly executed until the termination condition is satisfied.

On the other hand, in a case where it is determined that the termination condition has been satisfied, the GNSS satellite signal selected in Step 25" is finally set as a selection result.

Examples of the termination condition included in the selection parameters include "a predetermined period of time has elapsed since Step 21" has been executed first", "the number of repetitions of Steps 21" to 27" has reached a predetermined number of times", "a GNSS satellite corresponding to each of the GNSS satellite signals selected in Step 25" is not changed from the GNSS satellite corresponding to each of the GNSS satellite signals selected in Step 25" in the previous repetition", or the like.

Supplement

As described above, in the positioning system 1 according to the first embodiment or the second embodiment, positioning is performed by the server apparatus 20 connected to the GNSS receiver 10 via the communication means 30 in accordance with a reception environment of the GNSS receiver 10, and the like. Further, in the positioning system 1 according to the third embodiment, positioning is performed by both the GNSS receiver 10 and the server apparatus 20, and in a case where a fix solution of carrier-phase-based positioning is not obtained by the GNSS receiver 10, a positioning result in the server apparatus 20 is transmitted to the GNSS receiver 10. For this reason, in the positioning system 1 according to any one of the first to third embodiments, high-accuracy positioning can be performed even with a location where a reception environment is not good such as an urban canyon environment.

Further, in the positioning system 1 according to the fourth embodiment, a GNSS satellite signal used for positioning in the GNSS receiver 10 is selected by the server apparatus 20. For this reason, in the positioning system 1 according to the fourth embodiment, high-accuracy positioning can be performed even with a location where a reception environment is not good such as an urban canyon environment, and a processing time required for processing for selecting a GNSS satellite signal can also be reduced.

Here, in the first to fourth embodiments described above, description has been given of a case where the GNSS receiver 10 does not store observational data in the storage unit 105 or the like, and positioning is performed by the GNSS receiver 10 or the server apparatus 20 using the observational data. While such a positioning method is also referred to as real-time positioning, the first to fourth embodiments described above are not limited to real-time positioning, and can also be similarly applied to, for example, a case where positioning is performed by the GNSS receiver 10 or the server apparatus 20 using observational data obtained for a certain period of time and stored in the storage unit 105 or the like (this is also referred to as post-processing positioning). In a case where post-processing positioning is performed, the GNSS receiver 10 stores observational data obtained for a certain period of time in the storage unit 105 or the like and then, for example, performs positioning using the observational data in a case where positioning is performed by the GNSS receiver 10 and to transmits the observational data to the server apparatus 20 in a case where positioning is performed by the server apparatus 20. Note that, in a case where observational data and the like are transmitted to the server apparatus 20 in post-processing positioning, for example, an RINEX format or the like is used.

The present invention is not limited to the above-described embodiments specifically disclosed, and various modifications, changes, combinations, and the like can be made without departing from the scope of the claims. For example, at least two or more embodiments of the first to fourth embodiments can be combined.

REFERENCE SIGNS LIST

1 Positioning system
10 GNSS receiver
11 RF circuit
12 Baseband processing circuit
13 Communication I/F
14 Memory device
15 Processor
20 Server apparatus
21 Communication I/F
22 Processor
23 Memory device
30 Communication means
40 GNSS antenna
101 GNSS reception unit
102 Determination unit
103 Positioning unit
104 Communication unit
105 Storage unit
201 Communication unit
202 Positioning unit
203 Storage unit
204 Determination unit
205 Selection unit

The invention claimed is:

1. A positioning system comprising:
equipment configured to receive a signal from a GNSS satellite; and
a server apparatus configured to be connected to the equipment via a communication network,
wherein the equipment includes a memory and a processor configured to:
 transmit information indicated by the signal to the server apparatus, and
 perform positioning of the equipment by using the information indicated by the signal,
wherein the server apparatus includes a memory and a processor configured to perform positioning of the equipment by using the information indicated by the signal received from the equipment, and
wherein:
 any one of the processor of the equipment and the processor of the server apparatus is further configured to (i) receive data indicative of an environment in which the equipment receives the signal from the GNSS satellite and (ii) determine, in response to the received data, which one of the equipment and the server apparatus is set to be a positioning performer that performs positioning of the equipment,
 the processor of the equipment performs positioning in a case where the equipment is determined as the positioning performer, and
 the processor of the server apparatus performs positioning in a case where the server apparatus is determined as the positioning performer.

2. The positioning system according to claim 1, wherein:
the positioning performer is determined to be the equipment in a case where the environment for receiving the signal is an open sky environment, and
the positioning performer is determined to be the server apparatus in a case where the environment for receiving the signal is an urban canyon environment.

3. The positioning system according to claim 1, wherein, based on the environment for receiving the signal being an open sky environment, the positioning performer is determined to be the equipment to cause the processor of the equipment to execute code-based positioning, and wherein, based on the environment for receiving the signal being an urban canyon environment, the positioning performer is determined to be the server apparatus to cause the processor of the server apparatus to execute carrier-phase-based positioning.

4. A positioning system comprising:

equipment configured to receive a signal from a GNSS satellite; and a server apparatus configured to be connected to the equipment via a communication network, wherein the equipment includes a memory and a processor configured to:

transmit information indicated by the signal to the server apparatus, and perform positioning of the equipment by using the information indicated by the signal, wherein the server apparatus includes a memory and a processor configured to perform positioning of the equipment by using the information indicated by the signal received from the equipment, and wherein:

the processor of the equipment transmits a request for acquiring a positioning result to the server apparatus in a case where a fix solution of carrier-phase-based positioning is not obtained by the equipment; and the processor of the server apparatus is further configured to transmit a positioning result of carrier-phase-based positioning performed by the server apparatus to the equipment when the request for acquiring a positioning result is received.

5. A positioning system comprising:

equipment configured to receive a signal from a GNSS satellite; and a server apparatus configured to be connected to the equipment via a communication network, wherein the equipment includes a memory and a processor configured to:

transmit information indicated by the signal to the server apparatus, and perform positioning of the equipment by using the information indicated by the signal, wherein the server apparatus includes a memory and a processor configured to perform positioning of the equipment by using the information indicated by the signal received from the equipment, and wherein the processor of the server apparatus specifies an attribute of a mobile object which is equipped with or has the equipment from time variation of past positioning results of the equipment, specifies a portion of a region of a road on which the mobile object moves using the past positioning results and geospatial information in accordance with the specified attribute, and performs positioning of the equipment using the specified region as a candidate region of a positioning result.

6. A positioning system comprising:

equipment configured to receive a signal from a GNSS satellite; and a server apparatus configured to be connected to the equipment via a communication network, wherein the equipment includes a memory and a processor configured to:

transmit information indicated by the signal to the server apparatus, and perform positioning of the equipment by using the information indicated by the signal, wherein the server apparatus includes a memory and a processor configured to perform positioning of the equipment by using the information indicated by the signal received from the equipment, and wherein the processor of the server apparatus specifies validity of a positioning result of the positioning of the equipment, using a simulation result obtained by ray trace simulation, the information indicated by the signal received by the equipment, and information indicating a reception state when the equipment receives the signal.

7. Equipment connected to a server apparatus via a communication network, the equipment comprising a memory and a processor configured to:

receive a signal from a GNSS satellite;

transmit information indicated by the signal to the server apparatus;

determine which one of the equipment and the server apparatus is set to be a positioning performer that performs positioning of the equipment, in accordance with a reception environment for the signal;

perform positioning of the equipment by using the information indicated by the signal in a case where the equipment is determined as the positioning performer; and transmit a positioning instruction for positioning the equipment to the server apparatus in a case where the server apparatus is determined as the positioning performer, wherein:

any one of the processor of the equipment and a processor of the server apparatus is further configured to (i) receive data indicative of an environment in which the equipment receives the signal from the GNSS satellite and (ii) determine, in response to the received data, which one of the equipment and the server apparatus is set to be a positioning performer that performs positioning of the equipment, the processor of the equipment performs positioning in a case where the equipment is determined as the positioning performer, and the processor of the server apparatus performs positioning in a case where the server apparatus is determined as the positioning performer.

8. The equipment according to claim 7, wherein, based on the environment for receiving the signal being an open sky environment, the positioning performer is determined to be the equipment to cause the processor of the equipment to execute code-based positioning, and wherein, based on the environment for receiving the signal being an urban canyon environment, the positioning performer is determined to be the server apparatus to cause the processor of the server apparatus to execute carrier-phase-based positioning.

9. A server apparatus connected to equipment, receiving a signal from a GNSS satellite, via a communication network, the server apparatus comprising a memory and a processor configured to:

receive information indicated by the signal from the equipment; and perform positioning of the equipment by using the information indicated by the signal, wherein the positioning of the equipment is performed in a case where a positioning instruction transmitted from the equipment in accordance with a reception environment of the equipment is received, and wherein:
- any one of a processor of the equipment and the processor of the server apparatus is further configured to (i) receive data indicative of an environment in which the equipment receives the signal from the GNSS satellite and (ii) determine, in response to the received data, which one of the equipment and the server apparatus is set to be a positioning performer that performs positioning of the equipment,
- the processor of the equipment performs positioning in a case where the equipment is determined as the positioning performer, and
- the processor of the server apparatus performs positioning in a case where the server apparatus is determined as the positioning performer.

10. The server apparatus according to claim 9,
wherein, based on the environment for receiving the signal being an open sky environment, the positioning performer is determined to be the equipment to cause the processor of the equipment to execute code-based positioning, and wherein, based on the environment for receiving the signal being an urban canyon environment, the positioning performer is determined to be the server apparatus to cause the processor of the server apparatus to execute carrier-phase-based positioning.

* * * * *